United States Patent
Dayanandan et al.

(10) Patent No.: US 10,733,754 B2
(45) Date of Patent: Aug. 4, 2020

(54) GENERATING A GRAPHICAL USER INTERFACE MODEL FROM AN IMAGE

(71) Applicant: Oracle International Corporation, Redwood Shores, CA (US)

(72) Inventors: Kailas Dayanandan, Thiruvananthapuram (IN); Philips George John, Kottayam (IN)

(73) Assignee: Oracle International Corporation, Redwood Shores, CA (US)

( * ) Notice: Subject to any disclaimer, the term of this patent is extended or adjusted under 35 U.S.C. 154(b) by 456 days.

(21) Appl. No.: 15/613,122

(22) Filed: Jun. 2, 2017

(65) Prior Publication Data
US 2018/0203571 A1    Jul. 19, 2018

Related U.S. Application Data

(60) Provisional application No. 62/447,834, filed on Jan. 18, 2017.

(51) Int. Cl.
*G06T 7/73*    (2017.01)
*G06F 8/38*    (2018.01)
*G06F 8/35*    (2018.01)

(52) U.S. Cl.
CPC .................. *G06T 7/73* (2017.01); *G06F 8/35* (2013.01); *G06F 8/38* (2013.01)

(58) Field of Classification Search
CPC ................ G06T 7/73; G06F 8/35; G06F 8/38
See application file for complete search history.

(56) References Cited

U.S. PATENT DOCUMENTS

| 5,386,508 A | 1/1995 | Itonori et al. |
| 5,404,441 A | 4/1995 | Satoyama |
| 5,973,696 A | 10/1999 | Agranat et al. |

(Continued)

FOREIGN PATENT DOCUMENTS

| CN | 107516005 A | 12/2017 |
| WO | 2005038648 A1 | 4/2005 |

(Continued)

OTHER PUBLICATIONS

Wu et al., "Recursive Algorithms for Image Segmentation Based on a Discriminant Criterion," 2007, https://www.sernanticscholar.org/paper/Recursive-Algorithms-for-Image-Segmentation-Based-a-Wu-Chen/9c7cce1c0407427bf86a3b1bfada97ba49a9c13a.*

(Continued)

*Primary Examiner* — Ryan Barrett
(74) *Attorney, Agent, or Firm* — Kilpatrick Townsend & Stockton LLP

(57) ABSTRACT

Techniques are disclosed for generating a GUI model for an application based upon requirements information for an application. The requirements information may include an image of a GUI screen (or multiple images of multiple screens) included in the GUI for the application. The GUI model generated based upon the input image may include information about the type and placement (layout) of GUI components in the GUI screen, and may also include information indicative of one or more functions to be assigned to one or more of the GUI components in the GUI screen. The GUI model may then be used to generate an implementation of the application GUI, including generating executable code that implements the GUI screen.

20 Claims, 24 Drawing Sheets

(56) References Cited

U.S. PATENT DOCUMENTS

| | | |
|---|---|---|
| 6,434,598 B1 | 8/2002 | Gish |
| 6,496,202 B1 | 12/2002 | Prinzing |
| 7,100,118 B1 | 8/2006 | Klask |
| 7,146,347 B1 | 12/2006 | Vazquez et al. |
| 7,334,216 B2 | 2/2008 | Molina-moreno et al. |
| 7,392,162 B1 | 6/2008 | Srinivasan et al. |
| 7,620,885 B2 | 11/2009 | Moulckers et al. |
| 7,702,417 B2 | 4/2010 | Ravish et al. |
| 7,861,217 B2 | 12/2010 | Ciolfi |
| 8,006,224 B2 | 8/2011 | Bateman et al. |
| 8,015,541 B1 | 9/2011 | Srinivasan et al. |
| 8,306,255 B1 | 11/2012 | Degnan |
| 8,484,626 B2 | 7/2013 | Nagulu et al. |
| 8,762,873 B2 | 6/2014 | Pnueli et al. |
| 8,943,468 B2 | 1/2015 | Balasubramanian |
| 9,135,151 B2 | 9/2015 | Betak et al. |
| 9,170,778 B2 | 10/2015 | Ivmark et al. |
| 9,195,572 B2 | 11/2015 | Rossi |
| 9,261,950 B2 | 2/2016 | Gu et al. |
| 9,323,418 B2 | 4/2016 | Divita et al. |
| 9,338,063 B2 | 5/2016 | Ligman et al. |
| 9,430,141 B1 | 8/2016 | Lu et al. |
| 9,459,780 B1 | 10/2016 | Smith et al. |
| 9,619,209 B1 | 4/2017 | Allen et al. |
| 9,665,350 B1 | 5/2017 | Kalmar et al. |
| 10,255,085 B1 | 4/2019 | Valsaraj et al. |
| 2002/0169658 A1 | 11/2002 | Adler |
| 2006/0106798 A1* | 5/2006 | Wen ............... G06F 40/117 |
| 2010/0115434 A1 | 5/2010 | Yagi et al. |
| 2010/0131916 A1 | 5/2010 | Prigge |
| 2011/0035345 A1 | 2/2011 | Duan et al. |
| 2011/0047488 A1 | 2/2011 | Butin et al. |
| 2011/0099499 A1 | 4/2011 | Pnueli et al. |
| 2011/0214107 A1 | 9/2011 | Barmeir et al. |
| 2012/0166978 A1 | 6/2012 | Singh et al. |
| 2012/0230546 A1* | 9/2012 | Hua ............... G06K 9/00677 |
| | | 382/103 |
| 2013/0254686 A1 | 9/2013 | Sun |
| 2014/0068553 A1 | 3/2014 | Balasubramanian |
| 2014/0098209 A1 | 4/2014 | Neff |
| 2014/0282217 A1 | 9/2014 | Musa et al. |
| 2015/0020006 A1 | 1/2015 | Kotzer |
| 2015/0046783 A1 | 2/2015 | O'Donoghue et al. |
| 2016/0034441 A1 | 2/2016 | Nguyen et al. |
| 2016/0147434 A1* | 5/2016 | Lee ............... G06F 3/0482 |
| | | 715/838 |
| 2016/0163052 A1* | 6/2016 | Kim ............... G06F 3/04817 |
| | | 715/766 |
| 2016/0239186 A1 | 8/2016 | Skripkin |
| 2016/0353030 A1 | 12/2016 | Gao et al. |
| 2017/0060368 A1 | 3/2017 | Kochura |
| 2017/0277518 A1 | 9/2017 | Krishnan et al. |
| 2018/0203674 A1 | 7/2018 | Dayanandan |
| 2018/0349730 A1* | 12/2018 | Dixon ............... G06K 9/6202 |
| 2019/0371008 A1* | 12/2019 | Peterson ............... G06T 11/203 |

FOREIGN PATENT DOCUMENTS

| | | |
|---|---|---|
| WO | 2012162686 A1 | 11/2012 |
| WO | 2016162678 A1 | 10/2016 |

OTHER PUBLICATIONS

Kovacevic et al., "Recognition of common areas in a Web page using visual information: a possible application in a page classification," Dec. 9-12, 2002, 2002 IEEE International Conference on Data Mining pp. 250-257, https://ieeexplore.ieee.org/document/1183910.*

Pnueli et al. "Web Page Layout Via Visual Segmentation," Jul. 21, 2009, https://www.hpl.hp.com/techreports/2009/HPL-2009-160.pdf.*

"Buttons—UI Controls", iOS Human Interface Guidelines, available, online at https://developer.apple.com/ios/human-interface-guidelines/ui-controls/buttons/, 2017, 2 pages.

"Common Interfaces of Feature Detectors", OpenCV 2.4.13.2 documentation, 2011-2014, 11 pages.

"Design Principles—Overview", iOS Human Interface Guidelines, available online at https://developer.apple.com/ios/human-interface-guidelines/overview/design-principles/, 2017, 2 pages.

"How to create an app for free: easy app maker Appy Pie best app builder", avaiiable online at http://www.appypie.com/, 2017, 10 pages.

"Master Detail", Oracle Alta UI, available online at http://www.oracle.com/webfolder/ux/mobile/pattern/masterdetail.html, 2017, 15 pages.

"Mobile app for ios", SAP Business One Version 1.11.x, 2017, 17 pages.

"Mobile-Persistence", Github Inc., available online at https://github.com/oracle/mobile-persistence, 2017, 1 page.

"Navigation", Patterns—Material design guidelines, availabie online at https://material.io/guidelines/patterns/navigation.html, 2017, 13 pages.

"Oracle Technology Network for Java Developers", Oracle Technology Network, available online at http://www.oracle.com/technetwork/java/index.html, 2017, 2 pages.

"Programming Graphical User Interface (GUI)", GUI Programming—Java Programming Tutorial, available online at http://www3.ntu.edu.sg/home/ehchua/programming/java/j4a_gui.html, Mar. 2014, 47 pages.

"Ramer-Douglas-Peucker algorithm", Wikipedia, available online at https://en.wikipedia.org/wiki/Ramer%E2%80%93Douglas%E2%80%93Peucker_algorithm, 2017, 4 pages.

"Sales Cloud (@salescloud)", Twitter, available online at https://twitter.com/salescloud, 2017, 10 pages.

Da Cruz et al., "Automatic Generation of User Interface Models and Prototypes from Domain and Use Case Models", User Interfaces, available online at https://pdfs.semanticscholar.org/145d/356469c4cbbe76377c7b12a18715c018e5f7.pdf, May 2010, 26 pages.

Forssen , "Maximally stable colour regions for recognition and matching", IEEE Conference on Computer Vision and Pattern Recognition, Jun. 17-22, 2007, 8 pages.

Khambati et al., "Model-driven Development of Mobile Personal Health Care Applications", 23rd IEEE/ACM International Conference on Automated Software Engineering, Sep. 15-19, 2008, 4 pages.

Nguyen et al., "Reverse Engineering Mobile Application User Interfaces With REMAUI", available online at http://ranger.uta.edu/~csallner/papers/nguyen15reverse.pdf, Nov. 9-13, 2015, 12 pages.

Tsai et al., "Generating user interface for mobile phone devices using template-based approach and generic software framework", Journal of Information Science and Engineering vol. 23, No. 4, Jul. 2007, pp. 1189-1211.

Yeh et al., "Sikuli—Using GUI Screenshots for Search and Automation", available online at http://up.csail.mit.edu/projects/sikuli-uist2009.pdf, 2009, 10 pages.

Del Corro et al., "ClausIE Clause-Based Open Information Extraction", International World Wide Web Conference Committee (IW3C2), Jan. 13, 2005, 11 pages.

Fader et al., "Identifying Relations for Open Information Extraction"., Proceedings of the 2011 Conference on Empirical Methods in Natural Language Processing, Association for Computational Linguistics Jul. 27-31, 2011 pp. 1535-1545.

Canny, "A computational Approach to Edge Detection", IEEE Transactions on Pattern Analysis and Machine Intelligence, vol. PAMI-8, No. 6, Nov. 6, 1986, 20 pages.

OTSU, "A Threshold Selection Method from Gray-Level Histograms", IEEE Transactions on Systems, Man, and Cybernetics, vol. SmC-9, No. 1, Jan. 1979, 5 pages.

Enslen et al, "Mining Source Code to Automatically Split Identifiers for Software Analysis" International working Conference on Mining Software Repositories (MSR), 2009, 10 pages.

(56) References Cited

OTHER PUBLICATIONS

Pilehvar et al., "Align, Disambiguate and Walk: A Unified Approach for Measuring Semantic Similarity", Proceedings of the 51st Annual Meeting of the Association for Computational Linguistics, Aug. 4-9, 2013, pp. 1341-1351.

U.S. Appl. No. 15/801,890, Non-Final Office Action dated Jan. 22, 2019, 24 pages.

International Patent Application No. PCT/US2018/041038, International Search Report and Written Opinion dated Oct. 29, 2018, 11 pages.

GitHub—tonybeltramelli/pix2code: pix2code: Generating Code from a Graphical User Interface Screenshot, https://github.com/tonybeltramelli/pix2code, (retrieved Nov. 30, 2017), pp. 1-4.

Miller, This Startup Uses Machine Learning to Turn UI Designs Into Raw Code, https://www.fastcodesign.com/90127911/this-startup-uses-machine-learning-to-turn-ui-designs-into-raw-code, Jun. 2, 2017, (retrieved Nov. 30, 2017), 3 pages.

Kobielus, Machine Learning Will Do Auto-Programming's Heavy Lifting, DATAVERSITY, data governance Winter Conference, Dec. 4-8, 2017, http://www.dataversity.net/machine-learning-will-auto-programmings-heavy-lifting/, Jun. 26, 2017, 2 pages.

No More Coding, Aricent, Development Agility, The Augmented Programmer, https://www.aricent.com/articles/no-more-coding, Jun. 30, 2017, 3 pages.

Mou et al., On End-to-End Program Generation from User Intention by Deep Neural Networks, Software Institute, School of EECS, Peking University, Beijing 100871, P.R. China, Oct. 25, 2015, 4 pages.

Das et al., Contextual Code Completion Using Machine Learning, 2015, 6 pages.

U.S. Appl. No. 15/996,311, filed Jun. 1, 2018, 102 pages.

UX Wireframing & Prototyping, Sendinthefox, Mobile Experience Designer, retrieved from http://www.sendinthefox.com/mobile-ux-wireframes-prototyping/ on Feb. 24, 2018, Copyright 2018, 10 pages.

Larsen, From Sketches to Functional Prototypes: Extending WireframeSketcher with Prototype Generation, Master of Science in Informatics, Norwegian University of Science and Technology, Department of Computer and Information Science, Dec. 2014 (submission date), 115 pages.

How to Create a Wireframe for Desktop Application, Visual Paradigm Community Circle, retrieved from https://circle.visual-paradigm.com/docs/user-experience-design/wireframe/how-to-create-a-wireframe-for-desktop-application/, on Feb. 24, 2018, Copyright 2018, Updated on Dec. 22, 2017, 42 pages.

SASH(s) Visual Designer, Wireframes I Use, A Reference for User Experience and Interaction Design Beginners, retrieved from http://www.sashsingh.com/wireframes-i-use/ on Feb. 24, 2018, 13 pages.

Del Corro et al., ClausIE: Clause-Based Open Information Extraction, International World Wide Web Conference Committee (IW3C2), Jan. 13, 2013, 11 pages.

The 6 Principles of Design, Visually, Inc., http://visually/6-principles-design, Oct. 23, 2017, pp. 1-8.

Lu et al., Discovering Interacting Artifacts from ERP Systems (Extended Version) 2015, 62 pages.

Barnett et al., Bootstrapping Mobile App Development, In Proceedings of the 37th IEEE International Conference on Software Engineering—vol. 2 (ICSE '15), vol. 2 IEEE Press, Piscataway, NJ, USA, 2015, pp. 657-660.

Building a complex Universal Windows Platform (UWP) app; UWP app developer, Microsoft Docs, Feb. 8, 2017, pp. 1-17.

Ling, Decision Marking Transition for MauKerja.my, Dribbble, https://dribbble.com/shots/2066972-Decision-Making-Transition-for-MauKerja-my, Oct. 23, 2017, Copyright 2017, pp. 1-5.

Response web design, https://in.pinterest.com/explore/responsive-web-design/, Oct. 23, 2017, 8 pages.

Bassett, Oracle® Cloud, Using Mobile Application Accelerator, 17.3.5, E88951-01, Sep. 2017, 164 pages.

Savva et al., ReVision: Automated Classification, Analysis and Redesign of Chart Images, In Proceedings of the 24th annual ACM symposium on User interface software and technology, UIST'11, Oct. 16-19, 2011, 10 pages.

iOS Human Interface Guidelines: iOS App Anatomy, developer.apple.com, Apple Inc., Copyright 2014, Updated Oct. 20, 2014, 2 pages.

iOS Human Interface Guidelines, iOS Design Themes, Oct. 20, 2017, 3 pages.

Stanford CoreNLP—Natural Language Software, CoreNLP version 3.8.0, https://stanfordnlp.github.io/CoreNLP/, Jan. 23, 2018, 6 pages.

Alphabetical List of Part-of Speech Tags Used in the Penn Treebank Project, Penn Treebank P.O.S. Tags, https://www.ling.upenn.edu/courses/Fall_2003/ling001/penn_treebank_pos.html, Jan. 23, 2018, 2 pages.

Schramm et al., Rapid UI Development for Enterprise Applications: Combining Manual and Model-Driven Techniques, SAP Research Center Dresden, D.C. Petriu, N. Rouquette, Ø. Haugen (Eds.): Model Driven Engineering Languages and Systems, MODELS 2010, Part I, Lecture Notes in Computer Science vol. 6394, 2010, pp. 271-285, Springer, Berlin, Heidelberg.

Transcript and associated screen shots for YouTube video "MCS:89. Mobile Application Accelerator (MAX) Demo", Oracle Mobile, by Grant Ronald, published on May 9, 2016 (total length of video: 12:26) 29 pages.

Transcript and associated screen shots for YouTube video "How to Customize the Oracle Sales Mobile App" Demo Video Library, App Composer #44, Oracle, Fusion Applications Release 8, published on Oct. 15, 2014 (total length of video: 1:38) 5 pages.

Transcript and associated screen shots for YouTube video, "An Overview of Application Composer" Demo Video Library, Application Composer #68, Oracle. Fusion Application Release 11, published on Apr. 26, 2016 (total length of video: 5:28) 13 pages.

Suzuki et al., Topological Structural Analysis of Digitized Binary Images by Border Following Computer Vision, Graphics, and Image Processing 30, 1985, pp. 32-46.

How to convert iOS UI to Android, retrieved from http://androidux.com/work/beginner-guide/, Oct. 23, 2017, 16 pages.

Pleuss et al., Model-driven Development and Evolution of Customized User Interfaces, VaMoS '13 Proceedings of the Seventh International Workshop on Variability Modelling of Software-intensive Systems; Article 18, 2013, 10 pages.

Beckley, Android Design Guidelines, mutualmobile, Version 1, Feb. 2011, 31 pages.

Structure-Layout-Material Design, UI regions, retrieved from https://material.io/guidelines/layout/structure.html on Jan. 19, 2018, 24 pages.

U.S. Appl. No. 15/996,311, First Action Interview Pilot Program Pre-Interview Communication dated May 29, 2019, 19 pages.

U.S. Appl. No. 15/996,311, Notice of Allowance dated Aug. 8, 2019, 16 pages.

Herault et al., "Sparse Probabilistic Classifiers", ACM, ICML '07 Proceedings of the 24th International Conference on Machine Learning, 2007, pp. 337-344.

Huang et al., "A Learning-Based Contrarian Trading Strategy via a Dual-Classifier Model", ACM Transactions on Intelligent Systems and Technology, vol. 2, Issue 3, 2011, pp. 1-20.

Khaddam et al., "Towards Task-Based Linguistic Modeling for Designing GUIs", ACM, 2015, pp. 1-10.

Rathod, "Automatic Code Generation with Business Logic by Capturing Attributes from User Interface via XML", 2016 International Conference on Electrical, Electronics, and Optimization Techniques (ICEEOT), 2016, pp. 1480-1484.

Sabraoui et al., "GUI Code Generation for Android Applications Using a MDA Approach", 2012 IEEE International Conference on Complex Systems (ICCS), 2012, 6 pages.

Storrle, "Model Driven Development of User Interface Prototypes: An Integrated Approach", ACM, ECSA '10 Proceedings of the Fourth European Conference on Software Architecture: Companion Volume, 2010, pp. 261-268.

(56) References Cited

OTHER PUBLICATIONS

U.S. Appl. No. 15/801,890, Final Office Action dated Oct. 11, 2019, 23 pages.

* cited by examiner

1210 — ☰ Appointments

1212

Previous

Today  Oct 19, 2015

5:30 PM  Solution Briefings
John Doe
A Corporation

7:30 PM  Green Server Upgrade
75 Evergreen Rd, Santa Barbara, CA
7:30 - 8:30 PM
Jane Doe
B Corporation 10:30 PM  Meeting On Product Update
Jason Doe
C Corporation Tomorrow  Oct 20, 2015

7:30 PM  Lunch with Associate Manager
Fred Doe
D Corporation

1214 — Appointments | Call to log | Completed

FIG. 12

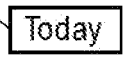
FIG. 15

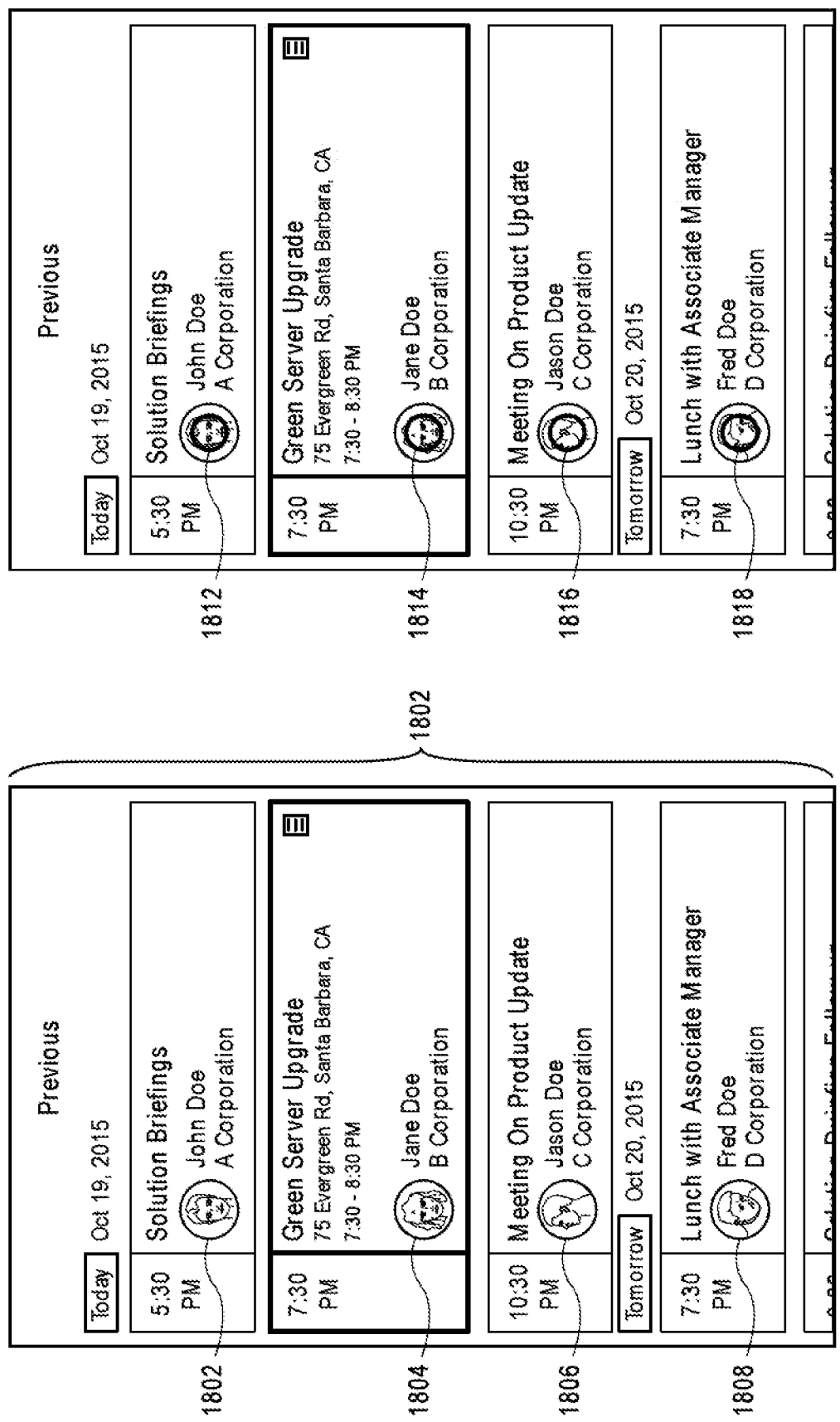

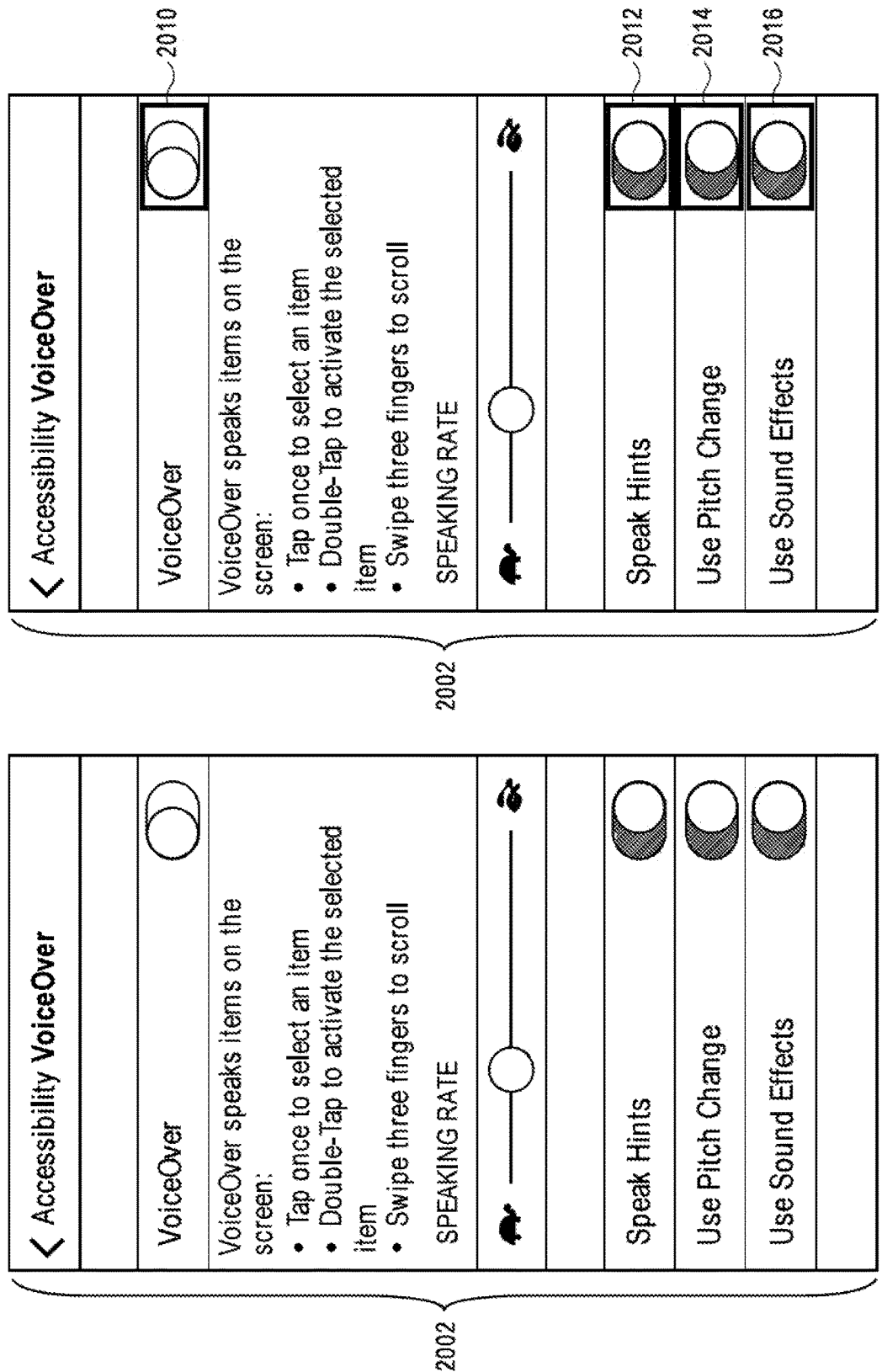

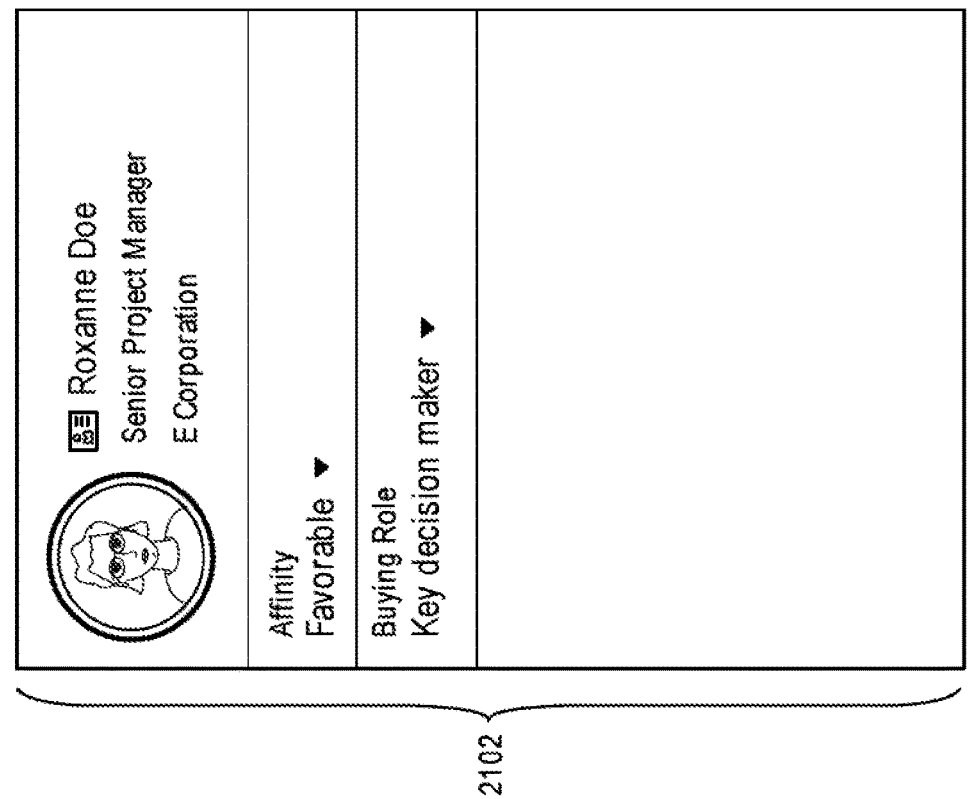
FIG. 21A
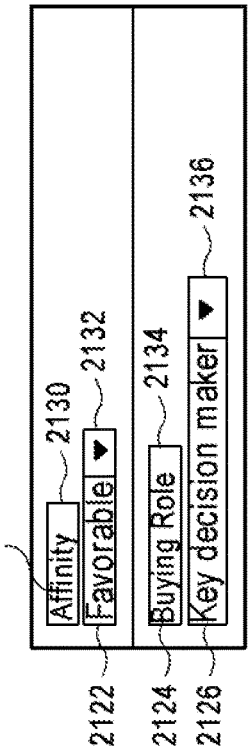
FIG. 21B
FIG. 21C

GENERATING A GRAPHICAL USER INTERFACE MODEL FROM AN IMAGE

CROSS-REFERENCES TO RELATED APPLICATIONS

This application is a non-provisional application and claims the benefit and priority of U.S. Provisional Application No. 62/447,834, filed on Jan. 18, 2017, entitled "GENERATING A GRAPHICAL USER INTERFACE MODEL FROM AN IMAGE," the content of which is herein incorporated by reference in its entirety for all purposes.

BACKGROUND

The present disclosure relates generally to application development, and more particularly to techniques that automate the development of graphical user interfaces (GUIs) for applications based upon application requirements information for the applications.

The visual appearance and interactivity provided by an application plays a critical role in whether or not the application is accepted by its users and thus to the overall success or failure of the application. As a result, a significant amount of time and effort is spent in designing and developing graphical user interfaces (GUIs) for applications. Further, with the proliferation of different types of computing devices, such as smart phones, tablets, laptops, and the like, an application typically has to have different GUIs suited for use on different computing devices. This dramatically increases the number of GUIs that have to be developed for an application.

The design of the GUI for an application is typically done early on in the requirements gathering phase in the development of an application. The GUI for the application may include one or more GUI screens or windows, with each screen comprising one or more GUI components. User experience (UX) designers are commonly used to determine the requirements of each individual screen in the GUI of an application. Images of GUI layouts are typically generated that visually represent how the screens in the application GUI are intended to appear. A requirements document is generally drafted that describes the requirements for the application including GUI requirements. The GUI requirements may be represented by mockup images representing the look-and-feel of the screens. Later on in the development lifecycle of the application, developers use these GUI images and requirements descriptions to implement the GUI. For example, coders write code for implementing the various screens included in the application GUI and adding functionality to the screens, as described in the requirements document.

The progression from a set of requirement GUI images to a full GUI implementation however involves a substantial amount of manual effort on behalf of the developers requiring not only a great deal of time but also significant human resources. This makes developing an application very time consuming and expensive.

BRIEF SUMMARY

The present disclosure relates generally to application development, more particularly to techniques that automate the development of graphical user interfaces (GUIs) for applications based upon application requirements information for the applications.

The application requirements information for an application may specify how screens or GUIs for the application are supposed to look like. For example, the application requirements information for an application may include one or more images (e.g., photos of mock-ups) of GUIs for the application. In certain embodiments, automated techniques are disclosed for generating the GUIs based upon these images.

In certain embodiments, a GUI model is automatically generated based upon the one or more input images in the application requirements information. The GUI model comprises information representing the one or more GUIs corresponding to the one or more input images, and for each GUI, comprises information indicative of the GUI components (e.g., buttons, icons, etc.) included in the GUI and their layout that is extracted from the input image corresponding to the GUI. In certain embodiments, the GUI model specifies what GUI components are included in the GUI, how the GUI components are hierarchically organized and laid out within the GUI, and what roles the GUI components serve.

In certain embodiments, a GUI model can be used for automated development of the GUI. For example, the GUI model can be used for one or more GUI development-related activities, such as, for example, to generate code that may implement the GUI. For example, the GUI model can be provided as input to an code generator (e.g., a GUI builder tool) for automated generation of code that implements one or more GUIs represented by the GUI model.

As described above, an image of a GUI screen may be received. The image may provide a visual representation of how a screen of the application GUI is meant to appear. For example, where the application is meant to execute on a mobile device (i.e., a mobile application), the image may depict a GUI screen that spans the entirety of the mobile device's screen real estate. In certain embodiments, the arrangement of the image's pixels may be leveraged to programmatically generate a model of the GUI (i.e., the GUI model) that includes information for generating an implementation of the GUI screen. For example, the information contained in a GUI model may specify, for a particular GUI screen, a set of GUI components (e.g., buttons, drop down lists, etc.) that are included in the GUI screen. The information may also specify a physical layout of the GUI screen, where the physical layout corresponds to how the GUI components are visually laid out and/or hierarchically organized within the GUI screen. The information may further specify, for some of the GUI components in the GUI screen, roles or functions (i.e., GUI functions) that are associated with the GUI components.

In certain embodiments, upon receiving an input image depicting a GUI screen, the image is subjected to processing that extracts information about the GUI components in the input image, the layout of the components, and potential functions associated with the GUI components. The processing to be performed may be controlled by a set of rules. For example, GUI screen design for a mobile application generally follows a common paradigm based upon the platform of the mobile device on which the GUI is to be displayed. For example, GUI screens for a mobile application to be executed on a mobile device based upon an Android platform adhere to a certain look-and-feel (e.g., set of GUI design rules) for the Android platform. Likewise, GUI screens for a mobile application to be executed on an Apple iOS mobile device adhere to a certain look-and-feel specific to the iOS platform. Accordingly, different sets of rules may be specified for processing the input image corresponding to the different platform.

Further, certain assumptions can also be made about various portions of the image. For example, GUI screens generally comprise a header portion, a body portion, and a footer portion. These assumptions may be represented in the rules that are used to analyze the input image depicting a GUI screen. In certain embodiments, the input image may be partitioned into one or more partitions. For example, partitioning the input image into a portion of the image that corresponds to the GUI screen's header (i.e., a header partition), another portion of the image that corresponds to the GUI screen's body (i.e., a body partition), and another portion of the image that corresponds to the GUI screen's footer (i.e., a footer partition).

Each partition may then be further analyzed according to a set of rules, where the rules for analyzing one type of partition (e.g., a header partition) may be different from the rules for analyzing another type of partition (e.g., a body partition). Accordingly, once the partitions have been obtained, a particular set of rules may be determined for processing each of the partitions. For instance, a set of rules may be determined that apply to the header partition, another set of rules that apply to the body partition, and another set of rules that apply to the footer partition. It should be noted that the set of rules that applies to one partition may differ from another set of rules that applies to another partition.

For example, the set of rules for processing a header partition may encapsulate assumptions such as that the header partition comprises a title component in the center of the header partition, an icon to close the screen at the right side of the header partition, and the like. The set of rules determined for processing a header partition may thus encapsulate these assumptions for processing the header partition. In a similar manner, specific rules may control how to process body partitions, footer partitions, and other types of partitions.

In certain embodiments, after the input image depicting a GUI screen has been partitioned into partitions, partition-specific processing may then be performed. For each partition, the set of rules specific to that partition type may be determined and the partition processed based upon these rules. For a partition, processing may be performed to determine one or more GUI components included in the partition, a physical layout of the GUI components in the partitions, where the physical layout of a partition corresponds to how GUI components are visually organized within the partition. In some embodiments, processing may also be performed to determine functionality to be associated with one or more GUI components in the partition.

For certain partitions, the set of rules associated with the partition may cause a segment hierarchy (i.e., a set of segments contained in the partition, where the set of segments are organized in a hierarchical tree structure) (also referred to as a container hierarchy) to be determined as part of determining the partition's physical layout. For example, a partition may contain one or more top-level level segments. A top-level segment may in turn comprise sub-segments, which may in turn comprise sub-segments, and so on. In some embodiments, the segment hierarchy may be represent as a tree. The root node of the segment hierarchy may represent the partition itself. A direct child of the root node may correspond to a top-level segment. A node representing a top-level segment may in turn have one or more children nodes representing subsegments of the top-level segment, and so on. In this manner, the segment hierarchy for a partition may have multiple levels of nodes. Except for the root node, each node in the segment hierarchy may represent a segment of the partition, where a segment corresponds to an area within a partition that is closely or loosely bounded by a closed contour within the image.

Due to the predominantly rectangular shape of GUI screens and GUI components, identifying the segments (and subsegments) within a partition may include identifying bounded rectangular areas within the area of the input image corresponding to a partition. Other shapes (e.g., non-rectangular shapes) may also be used in alternative embodiments. If the area happens to encompass one or more GUI components that are determined from the image, the segment is considered to contain those GUI components. If the area happens to encompass one or more smaller closed contours that are detected in the image, the segment is considered to contain the smaller segments that correspond to those smaller closed contours. Such containment relationships between larger segments and smaller segments are represented by connections between parent nodes and their children in the segment hierarchy. Leaf nodes of the segment hierarchy may correspond to bottom-level segments (segments that do not contain other segments) or GUI components.

In certain embodiments, determining the segment hierarchy for a partition may involve recursive or iterative segmentation. The segment hierarchy may be initialized with a root node that corresponds to the associated partition. One or more top-level segments contained within the partition may then be detected via segmentation. Each of the top-level segments that are detected may then be placed in the segment hierarchy as direct children of the root node. Next, while the segment hierarchy has segments (e.g., the top-level segments) that have not been processed: (1) one of the unprocessed segments may be selected from the segment hierarchy, (2) an attempt may be made to detect sub-segments within the selected segment via segmentation, and (3) when one or more sub-segments are detected within the selected segment, each of the one or more sub-segments may be placed in the segment hierarchy as direct children of the selected segment. This process is interactively performed until all the segments have been determined for the partition.

In certain embodiments, the segmentation of a partition may be directed by the set of rules associated with the partition. In particular, the set of rules may cause one or more detection techniques to be used in scanning the pixels of the rectangular area that corresponds to the segment. For example, an edge detection operator may be used to detect edges of closed contours that are located within the partition. Next, one or more outermost closed contours may be determined from the detected edges and the borders of the segment. For each of the determined closed contours, a polygon-approximation algorithm may then be used to approximate a polygon from the closed contour. Next, a shape that is supported using layouts of the software development platform (e.g., rectangular sub-segments) may be detected from each of the approximated polygons.

In certain embodiments, determining the physical layout for a partition may comprise detecting GUI components within the partition. In particular, the set of rules for processing the partition may cause one or more detection techniques to be used for detecting, within the partition, one or more features (i.e., a distinctive arrangement of pixels, such as, icons or regions of text) that likely correspond to a GUI component (e.g., exceed a threshold probability of corresponding to a GUI component). For example, a blob detection technique may be used to detect one or more icons from the image partition that may correspond to an image-based GUI component, while a character recognition technique may be used to detect one or more regions of text that may each correspond to a text-based GUI component. If a segment hierarchy is to be determined for the partition, the detection of features may be performed beforehand to improve the accuracy of the segmentation process. In particular, detected features may be temporarily removed from the partition (e.g., replaced with a background color) to reduce noise during segmentation.

In certain embodiments, determining a GUI component corresponding to a detected feature of a partition may be directed by the set of rules associated with the partition. Determining a GUI component for a detected feature in the partition may involve associating the feature with a known GUI component. In particular, the known GUI component may be selected based on the set of rules determined for the partition, the visual characteristics of the detected feature, which may include the position of the feature within the partition.

In certain embodiments, the input image depicting a GUI screen may be analyzed to automatically determine functions to be associated with the GUI components. For example, analysis may be performed to determine that a particular button identified in a partition it to be associated with "exit" functionality. In some embodiments, the processing for determining GUI functions for identified GUI components of a partition may be directed by the set of rules associated with the partition. In particular, a GUI component may be assigned a GUI function, from a set of known GUI functions, based on the set of rules determined for the partition, the GUI component's type, one or more visual characteristics of the GUI component, and/or the position of the GUI component within the partition. It should be noted that certain commonly occurring GUI components may have pre-assigned GUI functions.

As indicated above, a GUI for an application may comprise one or more GUI screens. Each of the GUI screens may be represented by an image in the application requirements information. In a scenario where there are multiple images representing multiple screens, each of the images may be received and processed one after another as described in this disclosure. The outputs obtained from processing images may then be combined in the GUI model that is generated for the GUI for the application. For example, if the application is a mobile application whose GUI comprises three separate GUI screens, the three screens may be processed one after another and the output from processing the three screens may be combined to generate a GUI model for the mobile application. The GUI model may specify or indicate, for each of the GUI screens, a set of GUI components that are included in the screen, the physical layout of the screen, and, for one or more of the GUI components in the screen, GUI functions that are assigned to the one or more GUI components. In some embodiments, information within the GUI model may be encoded in a markup language (i.e., layout code) such as Extensible Markup Language (XML) or jQuery.

In certain embodiments, a feedback mechanism is used to improve the generation of the GUI model. For example, the feedback may be used to correct and reduce inaccuracies in generating the GUI model. In particular, the rules for generating GUI models the known GUI component, and the known GUI functions, may be stored in memory 122 and updated based on user input. For example, during the generation of a GUI model for a GUI with multiple screens, the output of processing a screen may be presented to the user for review in case there are inaccuracies in the output that the user can detect. If the user finds an inaccuracy in the output (e.g., the wrong GUI component was identified, the wrong function was assigned to a GUI component, the physical layout is incorrect), the user may provide feedback that corrects that inaccuracy. This feedback may be used to adjust and/or update the rules for generating GUI models.

A GUI model generated according to the teachings described herein can be used for automating different downstream functions. In certain embodiments, a GUI model for an application GUI may be used to generate an implementation of the GUI that implements at least a portion of the GUI's functionality and behavior. For example, the GUI model may be fed to a code generator that is capable of generating code in a particular programming language implementing the GUI. In some embodiments, multiple code generators may be provided corresponding to different computing platforms (e.g., Windows®, iOS®, Android®) or to different programming languages. The same GUI model may be fed to these multiple code generators, where each code generator generates a GUI implementation specific to a particular platform or in a specific programming language. A resulting GUI implementation may comprise source code that implements GUI functions assigned to identified GUI components in the GUI model.

Some embodiments disclosed herein may be implemented by a computer system that is configured to implement methods and operations disclosed herein. Yet some embodiments relate to systems, computer products, and machine-readable tangible storage media, which employ or store instructions for methods and operations disclosed herein. In at least one embodiment, systems may include one or more processors and memory. The memory may store instructions that are executable by the one or more processors to perform methods and operations disclosed herein. Systems may include a computer product, systems, portable consumer devices, machine-readable tangible storage media, modules, or a combination thereof, to perform methods and operations disclosed herein.

The foregoing, together with other features and embodiments will become more apparent upon referring to the following specification, claims, and accompanying drawings.

BRIEF DESCRIPTION OF THE DRAWINGS

Illustrative embodiments are described in detail below in reference to the following drawing figures:

FIG. 12 depicts an example of a header partition, a body partition, and a footer partition obtained from an image of a GUI according to certain embodiments.

FIGS. 15-16 depict an example of a body partition that is segmented according to certain embodiments.

FIGS. 18A-19B depict an example of a GUI component that is determined according to certain embodiments.

FIGS. 20A-20B depict an example of a GUI component that is determined according to certain embodiments FIGS. 21A-21C depict an example of a GUI component that is determined according to certain embodiments

DETAILED DESCRIPTION

Figure 1:
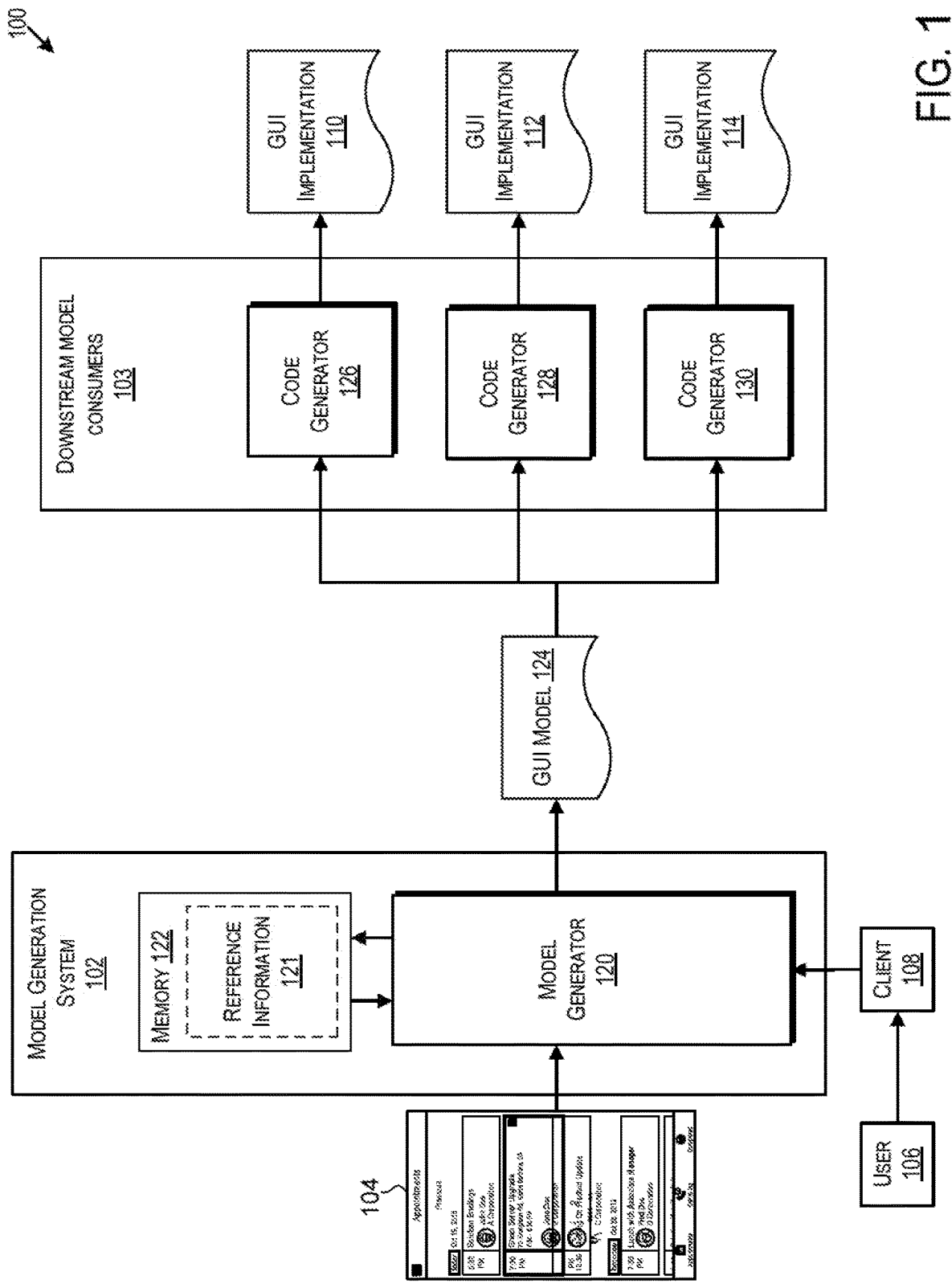
FIG. 1 depicts a simplified high level diagram of a development environment that may incorporate certain embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The present disclosure relates generally to techniques that facilitate the development of graphical user interfaces (GUIs). More particularly techniques are disclosed that are able to generate a GUI model based upon an input image of the GUI. For example, a graphical user interface (GUI) model may be generated from an image of an application's GUI. The generated model can subsequently be used for one or more GUI development-related activities, such as, for example, to generate code that may implement the GUI. In some embodiments, the technique can be embodied as an add-on to an existing development framework, such as a plugin for an integrated development environment (IDE).

In certain embodiments, an image depicting a GUI (e.g., a GUI window) is received as input. The input image is analyzed and a model generated for the GUI based upon the analysis. For example, an image may be received that depicts a static visual representation of a particular GUI screen or window for an application. The image is then analyzed and a model is generated for the GUI (i.e., the GUI model), where the model includes information about the GUI depicted in the image. The model may include, for example, information about the look and feel of the GUI and also possibly information related to functionality to be associated with the GUI.

The GUI model generated for a GUI based upon the image of the GUI may then used for various purposes by downstream model consumers. In one instance, the GUI model may be used to generate an implementation of the GUI. One example of downstream model consumers are code generators that are configured to, based upon the information in the GUI model, automatically generate code that implements the GUI, including the look and feel of the GUI and any functionality determined for the GUI as indicated by the model. Different code generators may generate GUI implementations using different programming languages. The GUI model may thus be used to build one or more executable implementations of the GUI in multiple programming languages. In some embodiments, some code generators may be part of an existing application development framework or an IDE. For example, the model generation system may be incorporated into a plugin that is installed into the host framework, where the plugin provides the GUI model to the code generator of the host framework. The code generator of the host framework may then generate code that implements the GUI.

As described above, the model that is generated for an image of a GUI (e.g., a GUI window) may include information related to the look and feel of the GUI. For example, the model may comprise information indicative of a set of GUI components (e.g., buttons, drop down lists, etc.) that are included in the GUI. The model may also include information indicative of a physical layout of the GUI and its components, where the physical layout may correspond to how the GUI components are visually laid out and/or hierarchically organized within the GUI.

As described above, in certain embodiments, the model that is generated for an image of a GUI may include information related to functionality to be associated with the GUI. For example, the model information may not only identify a set of components included in the GUI but also determine functionality with some or all of the components.

For purposes of explanation, certain examples are described below where the GUI is for a mobile application. The mobile application may be configured to execute on a mobile device platform, examples of which include, the Android platform, the iOS platform, and others. The GUI for the mobile application may comprise one or more GUI windows or screens (referred to generally as graphical user interfaces or GUIs). The GUIs may be displayed by a mobile device. The graphical interfaces when displayed may occupy the entirety of the mobile device's screen's real estate or a portion thereof. These examples are however intended to be illustrative and not restrictive. The teachings disclosed herein can also be applied to GUIs for other types of applications (e.g., non-mobile applications) such as desktop applications, web applications, enterprise applications, and the like. Further, the teachings of this disclosure are not restricted to a particular operating environment (e.g., a type of device used for displaying the GUIs, a particular operating system (OS), and the like) but instead can be applied to multiple different operating environments.

Some embodiments may generate a semantic UI model for a mobile application from one or more requirement images (e.g., a UI specification). Some embodiments may identify container hierarchy and UI components, which can be used for any platform.

According to certain embodiments, the the development costs are reduced and faster application development is enabled by automating a portion of application development. The semantic models/layouts that are generated by some embodiments may be accurate and also may have sufficient information for editing and also for working well with automation tools like testing tools. Some embodiments may provide a more detailed analysis of a problem for achieving more accurate results. Some embodiments may handle practical cases related to editing code, future maintenance, and automated test cases.

According to certain embodiments, the teachings described herein increase the speed of the development of applications (e.g., mobile applications) by reducing the amount of manpower and time needed as layout generation efforts are automated. The GUI model may also provide for a GUI implementation that is easier to optimize for faster GUI performance across applications. Certain embodiments implement a step in automatic code generation for generic GUIs.

FIG. 1 depicts a simplified high level diagram of system 100 for generating a GUI model according to certain embodiments. The embodiment depicted in FIG. 1 is merely an example and is not intended to unduly limit the claimed embodiments. One of ordinary skill in the art would recognize many variations, alternatives, and modifications. As shown in FIG. 1, system 100 comprises a GUI model generation system 102 that is configured to receive requirement information 104 for an application as input and generate a GUI model 124 for the application's GUI. GUI model 124 may then be consumed by one or more consumers 103 to generate one or more GUI implementations 110, 112, 114, based upon GUI model 124. System 100 depicted in FIG. 1 is merely an example and is not intended to unduly limit the scope of inventive embodiments recited in the claims. One of ordinary skill in the art would recognize many possible variations, alternatives, and modifications. For example, in some implementations, system 100 may have more or fewer systems than those shown in FIG. 1, may combine two or more systems, or may have a different configuration or arrangement of systems.

Model generator subsystem 102 may be configured to receive requirements information 104 for an application to be developed. Requirements information 104 may be prepared by functional consultants, user experience (UX) designers, and the like. As depicted in FIG. 1, requirements information 104 may include an image 104 of a GUI screen for an application to be developed. Model generator subsystem 102 is then configured to generate a GUI model 124 based upon image 104. GUI model 124 may then be used for generating various GUI implementations 110, 112, and 114.

While only one image 104 is depicted in FIG. 1 for sake of simplicity, this is not intended to be limiting. If the GUI for the application to be developed has multiple GUI screens, then multiple images corresponding to the multiple GUI screens may be received as input by model generator subsystem 102. In instances where model generator subsystem 120 receives a sequence of images, model generator subsystem 102 may be configured to generate a single GUI model 124 for the sequence of images.

Image 104 that is provided as input to model generator subsystem 102 may be received in one of various different formats. For example, image 104 may be an image file such as a bitmap file, a JPEG file, a PNG file, a PDF file, and the like. Various different techniques may be used to generate image 104. For example, image 104 may be a photograph captured using an image capture device such as a camera, a scanner, and the like. As further examples, image 104 may be a screenshot of an existing application, such as an application that is graphically similar to the application that is currently being developed or a previous version of the application that is currently being developed. Image 104 may also be generated using an application such as an image editing application (e.g., various image editing applications provided by Adobe Corporation®). Image 104 may also be generated using software applications capable of creating or editing images such as various word processors (e.g., MS WORD®), diagramming applications (e.g., Visio®), and other applications.

In one exemplary use case scenario, image 104 may have been generated or created during the requirements gathering phase for an application and may represent a GUI screen to be built for the application. The GUI screen could be part of a set of screens included in the GUI for the application being developed. For example, image 104 may be a mockup image of a GUI window for an application. The application can be of different types including, without restriction, a mobile application, an enterprise application, a desktop application, a web application, a cloud-based application, and other types of applications. The application may be developed to execute on various different types of devices such as mobile devices and platforms (e.g., smart phones such as an iPhone®, an Android® phone, etc.), tablets (e.g., an iPad®), laptops, desktop computers, and the like. For example, image 104 may be an image of a GUI screen for a mobile application designed to execute on a mobile device, where the GUI screen or window spans the entirety of the mobile device's screen real estate or a portion thereof.

GUI model generation system 102 may comprise multiple subsystems that are configured to work together to generate GUI model 124. For example, in the embodiment depicted in FIG. 1, GUI model generation system 102 comprises a model generator subsystem 120. These subsystems may be implemented in software (e.g., code, instructions, program) executed by one or more processing units (e.g., processors, cores) of a computer system, hardware, or combinations thereof. The software may be stored on a non-transitory storage medium (e.g., on a memory device) such as in memory 122.

Model generator subsystem 120 is configured to analyze the input image 104 and determine information related to the GUI screen depicted by image 104. Model generator subsystem 120 is then configured to generate a GUI model 124 that captures the information determined by model generator subsystem 120 from the analysis of image 104. The information determined by model generator subsystem 120 and represented in GUI model 124 may include information related to the look-and-feel of the GUI screen. In certain embodiments, determining the look-and-feel information for a GUI screen may include partitioning the image into one or more partitions, determining a set of GUI components (e.g., buttons, drop down lists, segments, etc.) that are included in each of the partitions and their attributes (e.g., labels, sizes), determining the physical layout of the partitions within the GUI screen and the physical layout of the GUI components within the partitions including determining hierarchical containment relationships between segments of the partitions, and determining functionality to be associated with one or more of the GUI components.

In certain embodiments, GUI model 124 may be persisted to one or more files generated by model generator subsystem 120. The model information in the GUI model may be encoded using various formats. In certain embodiments, the GUI model information may be encoded in a markup language such as Extensible Markup Language (XML) or jQuery. Example GUI model information encoded in XML is provided below:

```
<?xml version="1.0" encoding="UTF-8" ?>
<amx:view xmlns:xsi="http://www.w3.org/2001/XMLSchema-instance"
xmlns:amx="http://xmlns.oracle.com/adf/mf/amx"
    xmlns:dvtm="http://xmlns.oracle.com/adf/mf/amx/dvt">
 <amx:panelPage id="pp1">
  <amx:facet name="header">
   <amx:outputText value="About" id="hdr"/>
  </amx:facet>
  <amx:facet name="primary">
   <amx:commandLink
    id="idSB" action="springboard"
    shortDesc="Springboard" >
    <amx:image id="i1" source="/images/springboard.svg"
    shortDesc="">
    </amx:image>
   </amx:commandLink>
  </amx:facet>
  <amx:facet name="secondary">
   <amx:commandLink
    id="idSetting" action="Settings"
    shortDesc="Settings" >
    <amx:image id="i2" source="/images/setting.svg"
    shortDesc="Settings">
    </amx:image>
   </amx:commandLink>
  </amx:facet>
  <amx:outputText id="ot1" value="This sample demonstrates various
UI components and techniques."/>
 </amx:panelPage>
</amx:view>
```

The sample GUI model information provided above depicts output text (i.e., "This sample demonstrate various UI components and techniques") and an image (i.e., springboard.svg) that is associated with a function (i.e., springboard). For instance, clicking on the image may cause the springboard function to be invoked.

In some embodiments, model generator subsystem 120 is configured to generate one or more XML files that store GUI model 124. The generated file(s) may be stored in memory 122 of GUI model generation system 102 or in some other memory location.

GUI model 124 may then provided as input to various downstream model consumers 103. Downstream model consumers 103 may include, for example, one or more code generator subsystems 126, 128, and 130. For instance, code generator subsystem 126 may take GUI model 124 as input and generate a GUI implementation 110 that implements the GUI, including the one or more GUI screens, represented by GUI model 104. In a similar manner, code generator subsystem 128 may generate GUI implementation 110 from GUI model 124, and code generator subsystem 130 may generate GUI implementation 114 from GUI model 124. In certain embodiments, the GUI model 124 may be passed to code generator subsystems 126, 128, and 130 by model generator subsystem 120 without first being persisted to a file.

In certain embodiment, code generators 126, 128, 130 each be configured to generate code using a specific language and for a particular platform (e.g., Windows, Android, IOS platforms). Accordingly, GUI implementations 110, 112, and 114 generated by the code generators may be in different programming languages and/or for different programming platforms. In this manner, GUI model 124 provides a single common input that can be used to generate different GUI implementations 110, 112, and 114.

In some embodiments, a code generator may generate code for automated testing of a GUI implementation. To facilitate the automated testing of a GUI implementation, in certain embodiments, a GUI implementation may additionally comprise labels, annotations, and other data that identify GUI components within the GUI. These labels, annotations, and other data may be used by automated testing suites to identify GUI components and GUI functions within the GUI implementation. Automated testing suites may generate and/or run tests tailored to thoroughly test the GUI components and GUI functions.

In certain embodiments, the processing performed by model generator subsystem 120 may be based on preconfigured reference information 121 that may be stored in memory 122. This preconfigured reference information 121 may include, for example, various rules that guide the processing of image 104 performed by model generator subsystem 120, information about various GUI components and GUI functions, information about different platforms, and the like. In certain embodiments, this reference information may be preconfigured by an administrator of GUI model generation system 102. This reference information may also be learned by GUI model generation system 102 (e.g., using unsupervised machine learning techniques) over the course of generating GUI models and based upon learning data. Model generator subsystem 120 may access this reference information from memory 122 during processing of image 104 and generation of GUI model 124.

A user 106 may interact with GUI model generation system 102 either directly or via a client device 108. The client device may be of different types, including, but not limited to a personal computer, a desktop computer, a mobile or handheld device such as a laptop, smart phone, tablet, etc., or other types of devices. Client device 108 may be communicatively coupled with GUI model generation system 102 directly or via a communication network. The communication network can be of various types and may support one or more communication networks. Examples of the communication network include, without restriction, the Internet, a wide area network (WAN), a local area network (LAN), an Ethernet network, a public or private network, a wired network, a wireless network, and the like, and combinations thereof. Different communication protocols may be used to facilitate the communications between client device 108 and GUI model generation system 102 including both wired and wireless protocols such as IEEE 802.XX suite of protocols, TCP/IP, IPX, SAN, AppleTalk®, Bluetooth®, and other protocols.

In certain embodiments, a user 106 using client device 108 may interact with model generator subsystem 120 using user interfaces provided by the model generation system. These user interfaces may by in the form of GUIs, command line interfaces (CLIs), and other interfaces. In certain embodiments, GUI model generation system 102 may be part of an integrated development environment (IDE).

User interactions with GUI model generation system 102 may take various forms. A user may provide application requirements information to model generator subsystem 102. For example, a user may provide image 104 (or images, where multiple GUI screens are associated with an application) to GUI model generation system 102 that is to be used for generating the GUI model. In certain embodiments, after the generation of GUI model 124, the GUI model may be presented to user 106 for review. This enables user 106 to evaluate the accuracy of the GUI model and, if warranted, to make changes and provide feedback. For example, if user 106, while reviewing GUI model 124, determines that one of the GUI components indicated in the model is incorrectly identified, the user may provide feedback (i.e., corrections) to model generator subsystem 120 via client device 108. Model generator subsystem 120 may then update the GUI model based on the user feedback. Model generator subsystem 120 may also learn from the user feedback such that the error is not repeated in subsequent generations of GUI models. In this manner, feedback loop from the user enables the accuracy of model generator subsystem 120 to be improved as it continues to process images, generate GUI models, and receive user feedback.

In certain embodiments, GUI implementations 110, 112, and 114 may each correspond to a code template that implements at least a portion of the application's GUI related functionality. The code template may be made up of one or more source code files containing high-level code (which may comprise methods, functions, classes, event handlers, etc.) that can be compiled or interpreted to generate an executable that can be executed by one or more processors of a computer system. Developers may augment the code template with additional code to complete the application's code base. For example, code generator subsystem 126 may be configured to receive one or more files comprising markup code corresponding to the GUI model and output a GUI implementation comprising one or more source code files by translating the markup code (e.g., XML) into (high-level) source code (e.g., Java).

GUI implementations 110, 112, and 114 may each be based on information specified in GUI model 124. For example, if the GUI model specifies that a GUI window or screen comprises a particular set of GUI components, the source code that is generated for the GUI window may include code logic for instantiating a GUI screen including each of the GUI components. If the GUI model specifies a particular physical layout of the GUI components in the GUI window, then the source code generated by code generator subsystem 126 may include code logic for positioning the GUI components within the GUI screen in accordance with the particular physical layout. If the GUI model specifies a GUI function for a particular GUI component in the GUI window, then the source code generated by code generator subsystem 126 may include code logic linking an instantiation of the GUI component with the GUI function's implementation or providing a hook that a developer can use to add code implementing the functionality.

Figure 2:
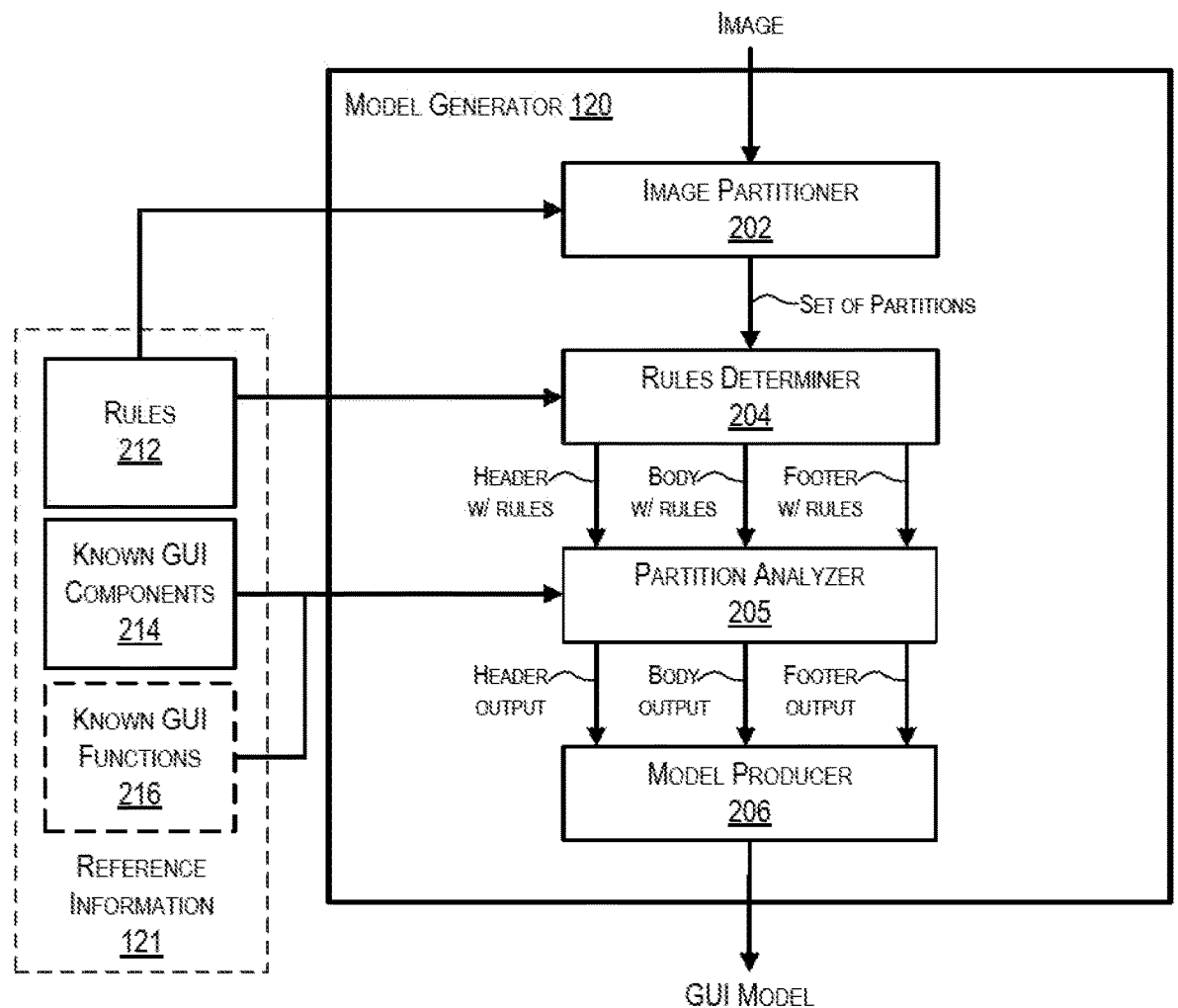
FIG. 2 depicts a more detailed high level diagram of a model generator according to certain embodiments.

FIG. 2 depicts a more detailed high level diagram of model generator subsystem 120 according to certain embodiments. As depicted in FIG. 2, model generator subsystem 120 comprises several subsystems or modules including an image partitioner subsystem 202, a rules determiner subsystem 204, a partition analyzer subsystem 205, and a model producer subsystem 206. These subsystems may be implemented in software (e.g., program code instructions executable by a processor), in hardware, or combinations thereof. In some embodiments, the software may be stored in memory (e.g., a non-transitory computer-readable medium), on a memory device, or some other physical memory and may be executed by one or more processing units (e.g., one or more processors, one or more processor cores, one or more GPUs, or combinations thereof). Model generator 120 depicted in FIG. 2 is merely an example and is not intended to unduly limit the scope of inventive embodiments recited in the claims. One of ordinary skill in the art would recognize many possible variations, alternatives, and modifications. For example, in some implementations, model generator 120 may have more or fewer systems than those shown in FIG. 2, may combine two or more systems, or may have a different configuration or arrangement of systems.

In certain embodiments, an image of a GUI screen or window that is provided as input to model generator subsystem 120 is forwarded to image partitioner subsystem 202. Image partitioner subsystem 202 is configured to identify the partition the GUI screen into a set of one or more partitions. The partitioning performed by image partitioner subsystem 202 may be rules based, i.e., may be guided by one or more rules from rules 212 accessible to model generator subsystem 120. For instance, one or more applicable rules may indicate that, if the GUI screen determined from the input image adheres to a common GUI paradigm, image partitioner subsystem 202 is to partition the GUI screen into three partitions: a header partition corresponding to a header of the GUI screen, a footer partition corresponding to a footer of the GUI screen, and a body partition corresponding to the section of the GUI screen situated between the header partition and the footer partition. In some embodiments, the header partition and/or the footer partition may be optional.

In certain embodiments, upon receiving an image, image partitioner subsystem 202 may be configured to determine some characteristics (e.g., metadata) associated with the GUI image and then determine the applicable partitioning rules based upon the characteristics. For example, image partitioner subsystem 202 may determine the dimensions of the GUI, whether the GUI is for a mobile application or desktop application, etc. This information may be determined based upon analysis of the input image or may also be provided as information accompanying the input image. For example, the user may provide a requirement image and specify that the requirement image is intended for an Android mobile application. Based upon this information, image partitioner subsystem 202 may determine that the application is a mobile application and that the GUI depicted by the image follows a common paradigm in mobile application GUI design, where each GUI screen comprises a header, a body, and a footer. As a result, image partitioner subsystem 202 may fetch, from rules 212, partitioning rules associated with the common paradigm (e.g., for the Android platform) that may then direct how the image partitioner subsystem 202 is to partition the GUI image. For example, the partition rules may indicate that the GUI image is to be partitioned into a header partition, a body partition, and a footer partition.

Image partitioner subsystem 202 may use various different techniques for partitioning the input GUI image. In certain embodiments, the partitioning rules may themselves identify one or more techniques to be used by image partitioner subsystem 202 for partitioning the GUI image. For example, in certain instances, a partition rule may cause image partitioner subsystem 202 to use an edge detection technique (e.g., Canny edge detection) to detect edges in the GUI image that visually define or demarcate areas of the input image into partitions. In some instances, if the partitions each happen to fall within a relevant height range (e.g., a height range that corresponds to a header, another height range that corresponds to the footer, and another height range that corresponds to the body), image partitioner subsystem 202 may deduce that the partitions correspond to a header, a body, and a footer. In certain embodiments, the process of partitioning a GUI image may be similar to the segmentation performed for generating a segment hierarchy, which is explained below with respect to FIG. 8. The partitions determined by image partitioner subsystem 202 are then passed to rules determiner subsystem 204 for further processing.

Rules determiner subsystem 204 receives information identifying one or more partitions partitioned by image partitioner 220. The information received from image partitioner 220 may include the partition and information related to the partition. The information related to the partition may include, for example, information identifying the partition (e.g. whether it is a header partition, body partition, or footer partition, the dimensions of the partition). In certain embodiments, for each partition, rules determiner subsystem 204 is configured to select, from rules 212, a set of rules for processing the partition. For example, for a header partition received from image partitioner subsystem 202, rules determiner subsystem 204 may then retrieve, from rules 212, a set of rules that apply to the header partition. In a similar manner, rules determiner subsystem 204 may determines a set of rules that apply to a body partition, a set of rules that apply to the footer partition, and so on. It should be noted that the set of rules that applies to one partition may be same as or may be different (e.g., the rules in the two sets may be completely different or some of the rules between the two sets may be different) from the set of rules that apply to another partition.

In certain embodiments, for a particular partition, rules determiner subsystem 204 may determine a set of associated rules based on what rules determiner subsystem 204 knows about the portion of the image depicted by the partition, the image, the GUI screen, and the application. For example, if rules determiner subsystem 204 knows that (1) the partition depicts a footer and (2) the application is intended to operate on the Android platform, rules determiner subsystem 204 may select rules specific for processing a footer for an Android GUI based upon assumptions that can be made about footers in Android applications. For example, the Android GUI specific rules for a footer may include (1) a rule that specifies that if an arrow icon is detected in the left section of the footer, and (2) a second rule that specifies that if such an arrow icon is located in the partition, then the arrow icon likely corresponds to a "back" button that causes the GUI to return to a previous screen of the GUI when invoked. Rules determiner subsystem 204 may then forward the partition and the rules selected for processing the partition to partition analyzer subsystem 205.

Partition analyzer 205 is configured to process and analyze the partition based upon rules for processing the partition received from rules determiner subsystem 204. For example, partition analyzer subsystem 205 may receive a footer partition and a set of rules for processing the footer partition from rules determiner subsystem 204. The partition analyzer subsystem 205 is configured to process the received partition based upon rules for processing the partition.

In certain embodiment, partition analyzer 205 is configured to determine additional information about the partition being analyzed. This information may include information related to the appearance of the partition and functions to be associated with the partition or with components in the partition. In certain embodiments, the processing performed by the partition analyzer includes determining the GUI components (e.g., buttons, text boxes, drop down lists, radio buttons, etc.) contained in the partition, determining the layout of the GUI components in the partition including determining hierarchical containment relationships between the components, determining characteristics of the GUI components (e.g., labels associated with the GUI components), and determining standard functions, if any, to be associated with the one or more of the GUI components (e.g., exit functionality, minimize/maximize functionality, etc.) in the partition.

In certain embodiments, partition analyzer 205 may also use reference information 121 (e.g., reference information stored in memory 122) to process the partitions, such as information 214 about known GUI components, information 216 about known GUI functions, and the like. For example, known information 214 may include information about different GUI components (i.e., GUI component information) that are commonly found in GUIs. For example, known information 214 may include information identifying various GUI components (e.g., buttons, text boxes, drop-down lists) and their associated characteristics. For example, for each known GUI component, information 214 may include a template GUI component (i.e., an example GUI component) that may be used to perform template matching with detected features of the image. GUI component information 214 may additionally include known phrases and known icons, which may also be used to identify text buttons and image buttons that are commonly found in similar GUIs. In some embodiments, GUI component information 214 may be organized into multiple dictionaries, where each dictionary corresponds to a a particular domain (i.e., domain specific dictionaries). For example, the information 214 may comprise a dictionary specific to the database domain (e.g., icons and phrases commonly occurring in database-related GUIs), another dictionary specific to the mobile application domain (e.g., icons and phrases commonly occurring in mobile application GUIs), another dictionary specific to the email domain (e.g., icons and phrases commonly occurring in email-related applications), and so on. The first dictionary may include phrases and icons that are commonly found in database application GUIs while the second dictionary may include phrases and icons that are commonly found in mobile application GUIs. It should be noted that certain domain specific GUI components may be preassociated with GUI functions. Thus, such pre-associations may be defined within the dictionary specific to the GUI component's domain. For example, the second dictionary may specify that the back icon '<', which is commonly found in mobile application GUIs, is associated with the "back" function, where invoking the back function causes a mobile application GUI to return to a previous screen of the GUI.

Known GUI functions information 216 may correspond to information about GUI functions that are commonly assigned to GUI components in similar applications. In some embodiments (e.g., when dealing with GUI's that primarily deal with domain-specific icons), known GUI functions information 216 may be subsumed into known GUI components information 214. Further details related to processing performed by the partition analyzer are discussed below (for example, with respect to FIG. 3).

In certain embodiments, the information determined by the partition analyzer for a partition may be forwarded to model producer subsystem 206 as partition-specific output. Model producer subsystem 206 may receive outputs for multiple partitions from partition analyzer subsystem 205. Model producer subsystem 206 is configured to build a GUI model for the GUI based upon the output(s) received from partition analyzer 205.

For example, for a GUI image partitioned into a header partition, a body partition, and a footer partition, model producer subsystem 206 may receive output information for the header partition, output information for the body partition, and output information for the footer partition from partition analyzer subsystem 205. Model producer 206 may then build a model for the GUI based upon the output information received for these multiple partitions.

In certain embodiments, partition specific outputs may be stored in a memory (e.g., 122 in FIG. 1), for example, persisted to a database, or written out to a file. After all the partitions for an input GUI image have been processed, image partitioner subsystem 202 may be configured to access the information for the partitions from the memory 122 and generate a GUI model 124 for the GUI screen. It should be noted that when image 104 is part of a sequence of images of GUI screens associated with an application, model producer subsystem 206 may generate GUI model 124 after all the partitions for the multiple images have been processed. Model generator 124 subsystem 120 may then generate the GUI model 124 based on the combined outputs of the multiple images.

In certain embodiments, model producer subsystem 206 may be able to further refine a partition specific output, e.g., by increasing the output's accuracy or by adding more information to the partition specific information. For example, model producer subsystem 206 may determine that, in both the header partition and the footer partition, a cancel function is assigned to a particular button GUI component, resulting in two "cancel buttons" in the corresponding GUI screen. Because a GUI screen generally has only a single cancel button, model producer subsystem 206 may identify this as a potential error. Model producer subsystem 206 may then perform processing to correct this potential error, which may involve modifying the output from one of the partitions so that the GUI screen only has a single cancel button.

A GUI model 124 generated for a GUI screen may comprise information about the GUI components located in the GUI screen, the layout of the GUI components in the GUI screen, and GUI functions, if any, that are to be assigned to one or more of the GUI components in the GUI. In some embodiments, if the GUI comprises multiple GUI screens, then the GUI model may also comprise information about the number of GUI screens included in the GUI, relationships between the GUI screens (e.g., how to reach other GUI screens from a particular GUI screen), and other information.

A GUI model 124 may then be used for various purposes. The GUI model may, for example, be useful in automating some of the manual GUI development task involved in creating a working implementation of the GUI screen. In one use case, GUI model 124 may be used to automatically generate a working implementation of the GUI (i.e., a GUI implementation) screens (or screens if there are multiple screens associated with the application). For example, as depicted in FIG. 1, GUI model 124 may be provided as input to one or more code generator subsystems 126, 128, and 130 to produce one of more GUI implementations 110, 112, and 114.

Figure 3:
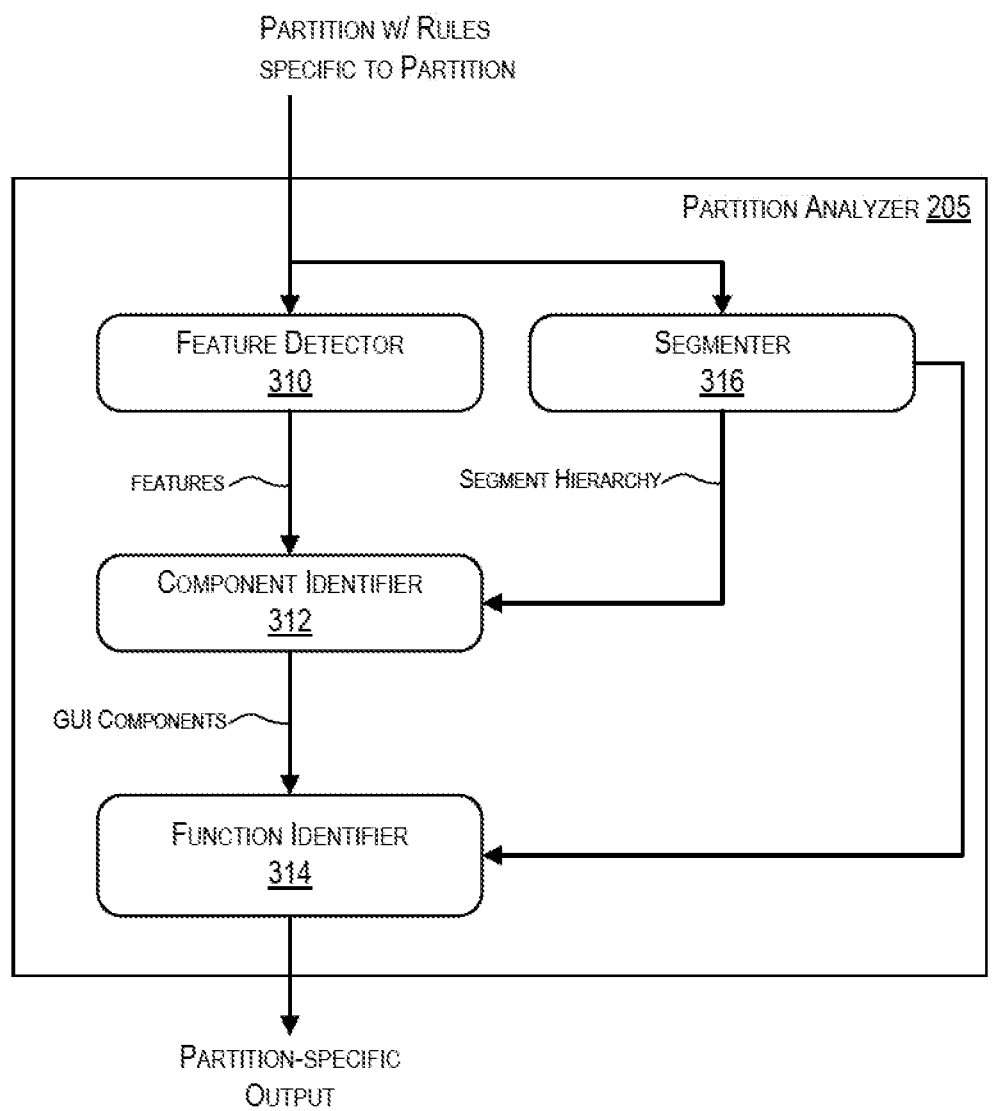
FIG. 3 depicts a more detailed high level diagram of a partition analyzer according to certain embodiments.

FIG. 3 depicts a more detailed high level diagram of partition analyzer subsystem 205. As shown in FIG. 3, partition analyzer subsystem 205 may comprise several subsystems or modules including a feature detector subsystem 310, a component identifier subsystem 312, a function identifier subsystem 314, and a segmenter subsystem 316. These subsystems may be implemented in software (e.g., program code instructions executable by a processor), in hardware, or combinations thereof. In some embodiments, the software may be stored in memory (e.g., a non-transitory computer-readable medium), on a memory device, or some other physical memory and may be executed by one or more processing units (e.g., one or more processors, one or more processor cores, one or more GPUs, or combinations thereof). Partition analyzer 205 depicted in FIG. 3 is merely an example and is not intended to unduly limit the scope of inventive embodiments recited in the claims. One of ordinary skill in the art would recognize many possible variations, alternatives, and modifications. For example, in some implementations, partition analyzer 205 may have more or fewer systems than those shown in FIG. 3, may combine two or more systems, or may have a different configuration or arrangement of systems.

As described above, partition analyzer subsystem 205 may receive information for various partitions, and for each partition, rules identified by ruler determiner 204 for processing the partition. Upon receiving a partition and an associated set of rules, the partition may be passed to feature detector subsystem 310, which may handle the detection of features in the partition (i.e., distinctive arrangements of pixels, e.g., icons or regions of text) that are likely to correspond to a GUI component. For example, a blob detection technique and image recognition may be used to detect icons that may correspond to image-based GUI components (e.g., an image buttons, radio buttons, switch buttons), while a character recognition technique may be used to detect regions of text that may correspond to text-based GUI components (e.g., a text buttons). In doing so, feature detector subsystem 310 may consult the set of rules associated with the partition for performing the processing. Upon the completion of the detection process, each of the detected features may be passed to component identifier subsystem 312 for further processing.

Certain types of partitions (e.g., body partitions) may be segmented by partition analyzer 205. Segmentation may involve recursively or iteratively detecting segments (e.g., closed contours or rectangles defined and/or bounded by visible edges within the partition) within a partition. Accordingly, partition analyzer subsystem 205 may comprise a segmenter subsystem 316, which may handle the creation of a segment hierarchy (i.e., a hierarchy of segments that are contained within the partition) for the partition. The root node of the segment hierarchy may correspond to the partition itself and each of the other nodes in the hierarchy may represent a segment in the partition, where a segment corresponds to an area within the partition that is closely or loosely bounded by a closed contour with in the image. There may be a containment relationship between one or more segments, where a segment may contain one or more other segments or subsegments). For example, a direct child of the root node in the segment hierarchy may correspond to a top-level segment. A node representing a top-level segment may in turn have one or more children nodes representing subsegments of the top-level segment, and so on. In this manner, the segment hierarchy for a partition may have multiple levels of nodes.

Due to the predominantly rectangular shape of GUI screens and GUI components, identifying the segments (and subsegments) within a partition may include identifying bounded rectangular areas within the area of the input image corresponding to a partition. Other shapes (e.g., non-rectangular shapes) may also be used in alternative embodiments. If the area happens to encompass one or more GUI components that are determined from the image, the segment is considered to contain those GUI components. If the area happens to encompass one or more smaller closed contours that are detected in the image, the segment is considered to contain the smaller segments that correspond to those smaller closed contours. Such containment relationships between larger segments and smaller segments are represented by connections between parent nodes and their children in the segment hierarchy. Leaf nodes of the segment hierarchy may correspond to bottom-level segments (segments that do not contain other segments) or GUI components.

In certain embodiments, segmenter subsystem 316 may use recursive or iterative segmentation to determine the segment hierarchy. The segment hierarchy may be initialized with a root node that corresponds to the associated partition. One or more top-level segments contained within the partition may then be detected via segmentation. Each of the top-level segments that are detected may then be placed in the segment hierarchy as direct children of the root node. Next, while the segment hierarchy has segments (e.g., the top-level segments) that have not been processed: (1) one of the unprocessed segments may be selected from the segment hierarchy, (2) an attempt may be made to detect, via segmentation, sub-segments within the selected segment, and (3) when one or more sub-segments are detected within the selected segment, each of the one or more sub-segments may be placed in the segment hierarchy as direct children of the selected segment.

In certain embodiments, segmenter subsystem 316 may consult the set of rules associated with the partition while segmenting a particular segment. In particular, the set of rules may cause one or more detection techniques to be used for scanning the pixels of the area that corresponds to the segment. For example, an edge detection operator may be used to detect edges that are located within a segment. Next, one or more outermost closed contours may be determined from the detected edges and the borders of the segment. For each of the determined closed contours, a polygon-approximation algorithm may then be used to approximate a polygon from the closed contour. Next, a sub-segment may be detected from each of the approximated polygons. In certain embodiments, for each feature that is detected by feature detector subsystem 310, a leaf node that corresponds to the GUI component may be added as a direct child of the node that corresponds to the smallest segment that contains the GUI component.

Figure 4:
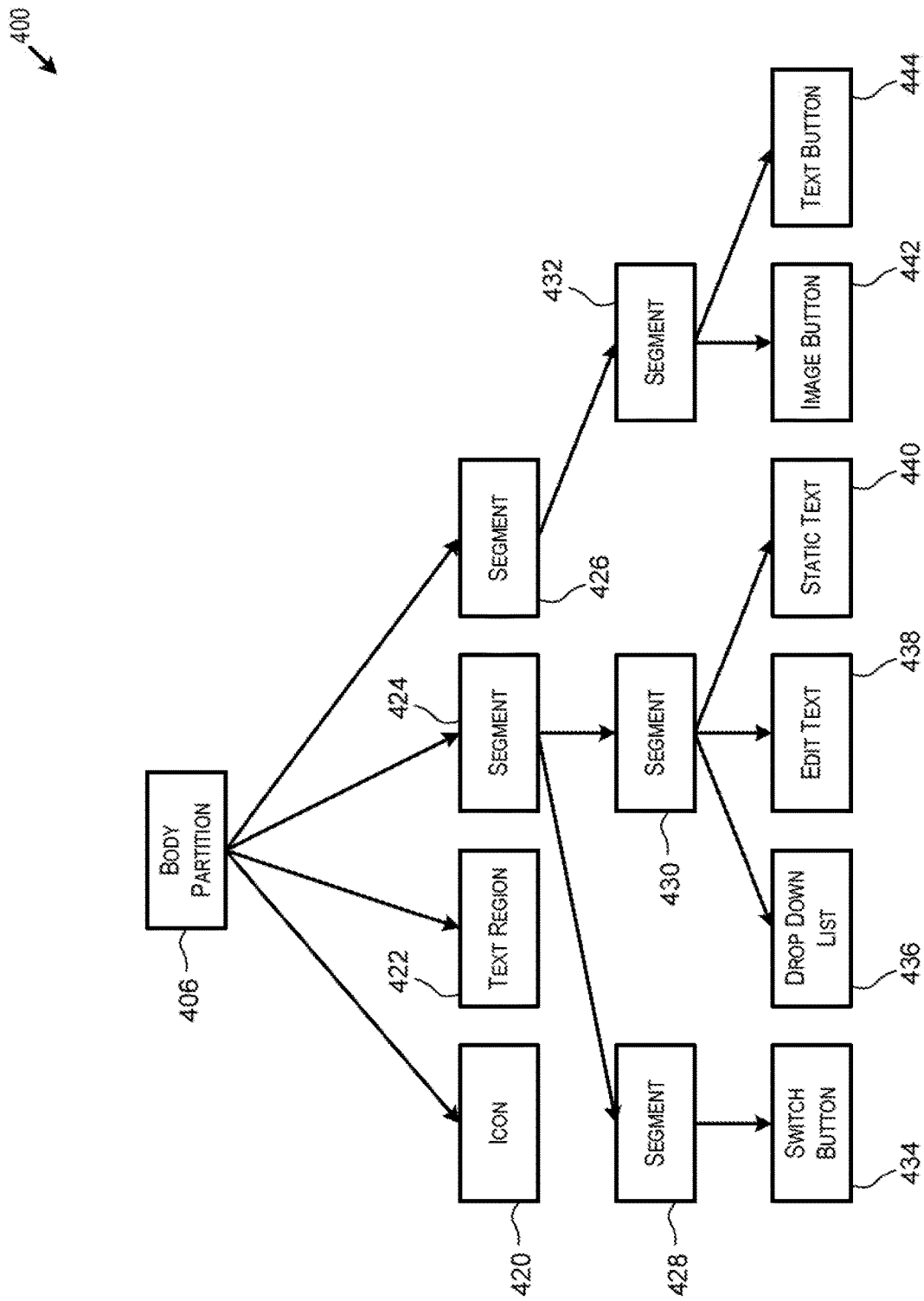
FIG. 4 depicts an example segment hierarchy that may be generated for a partition according to certain embodiments.

FIG. 4 depicts an example of a segment hierarchy 400 that may be generated for a body partition according to certain embodiments. As can be seen in FIG. 4, the root node 406 of segment hierarchy 400 corresponds to the body partition. The connections between the root node and its direct children specify that body partition 406 contains icon 420, text region 422 and top-level segments 424 and 426. The connections between the second row of nodes and their direct children specify that top-level segment 424 contains segment 428 and segment 430 and top-level segment 426 contains segment 432. The connections between the third row of nodes and their direct children specify that segment 428 contains switch button 434, segment 430 contains a drop down list 436, edit text 338 and static text 440, and segment 432 contains image button 442 and text button 444. Switch button 434 may have been identified from one or more text regions and/or icons detected in segment 428, components 436, 438, and 440 each may have been identified from one or more text regions and/or icons detected in segment 430, and components 442 and 444 each may have been identified from one or more text regions and/or icons detected in segment 432.

Returning to FIG. 3, upon the completion of the segmentation, the segment hierarchy may be passed to component identifier subsystem 312, which handles the identification of GUI components based on the detected features of the partition and the segment hierarchy of the partition. Determining a GUI component that corresponds to a detected feature may involve associating the feature with a domain and/or associating the feature with a known GUI component. In some embodiments, information related to the domain of the GUI being generated may be supplied by the user as input and this information may be used for determining GUI components. In particular, the determination of the domain and/or the GUI component may be based on a set of rules determined for the partition, the visual characteristics of the detected feature, the position of the feature within the partition, the supplied domain-related information, and other information. Exemplary domains may include a domain specific to mobile applications, a domain specific to database applications, a domain specific to email applications. Exemplary known GUI components that are not associated with a domain may include text buttons, image buttons, drop down lists, radio buttons, text edit fields, switch buttons, and other types of GUI components that are commonly found in similar applications. Exemplary known domain-specific GUI components may include, among others, back buttons, add buttons, drill-down buttons, delete buttons, search buttons, attachment buttons. The determination of GUI components are discussed in further detail below with reference to FIG. 9.

Upon the determination of the GUI components, certain GUI components (e.g., GUI components that are not associated with any domain) may be passed to function identifier subsystem 314, which handles the assignment of GUI functions to identified GUI components. A GUI function may refer to one or more blocks of code that implement a feature of the application (e.g., for a calculator application, performing a calculation) or an operation common to applications (e.g., minimizing an application's window, exiting a GUI window). When a GUI function is assigned to a GUI component, the GUI function can be invoked when the user of the application interacts with the GUI component (e.g., for a button component, performing a calculation when the user presses the button). In certain embodiments, function identifier subsystem 314 may reference GUI functions information 216 for known GUI functions associated with certain GUI components. Known GUI functions may include, for example, a cancel function, a back function, an exit function, a minimize function, a maximize function, and other functions or roles that are commonly assigned to GUI components of applications. A GUI component may be assigned a GUI function based on the set of rules determined for the partition, the GUI component's type, one or more visual characteristics of the GUI component, and/or the position of the GUI component within the partition. The assignment of GUI functions are discussed in further detail below with reference to FIG. 9.

For some GUI components (e.g., GUI components that are associated with a domain), the identities of the GUI components may be inextricably linked to their functions. For instance, a particular image button that commonly occurs in specific domains (e.g., database applications, mobile applications) may display a symbol that is closely associated with the image button's functional purpose. Thus, if a detected icon region is determined to be a domain-specific GUI component, the GUI component's function may be predefined. For example, if a detected feature is determined to be an image button that depicts a '<' sign, an assumption could be made that the image button is a "back button" that performs a "back" function (where invoking the back function by pressing the back button causes the GUI to return to a previous screen, mode, view, or window of the GUI). Thus, the step of assigning a GUI function to a GUI component may be based on a determination that the GUI component is domain-specific.

Upon function identifier subsystem 314 finishing the assignment of GUI functions, the output of partition analyzer subsystem 205 is provided to model producer subsystem 206. The output of processing the body partition may comprise information about the GUI components contained within the partition, how the GUI components are laid out within the partition (e.g., the segment hierarchy), and one or more GUI functions that are assigned to components within the partition. Model producer subsystem 206 may then combine the output of processing the partition with outputs from processing the rest of the partitions of the image (and output from processing partitions of other images) to generate GUI model 124.

Figure 5:
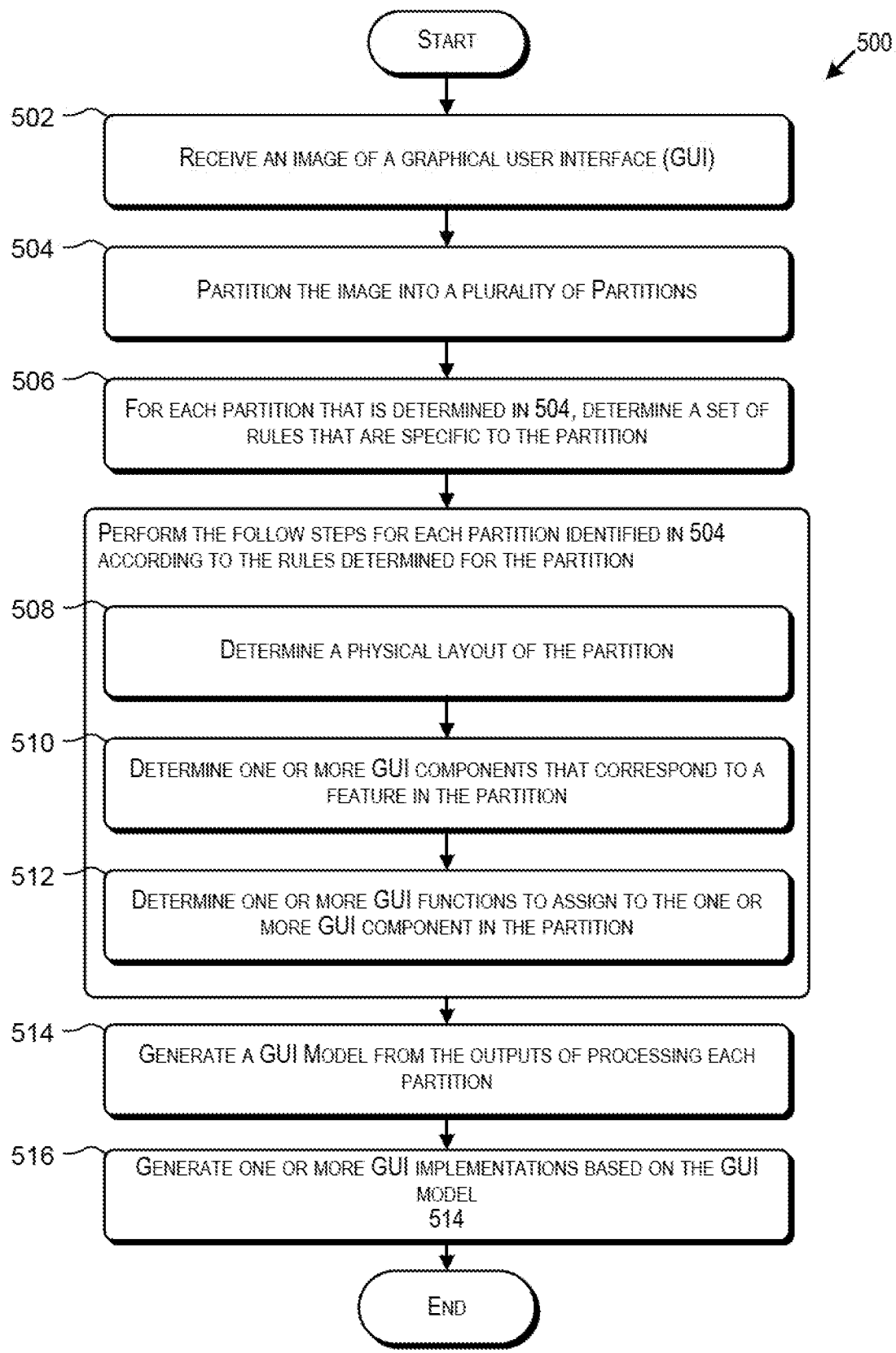
FIG. 5 depicts a simplified flowchart depicting processing performed for generating a graphical user interface (GUI) model from an image according to certain embodiments.

FIG. 5 depicts a simplified flowchart 500 depicting processing performed by a model generator to generate a GUI model according to an embodiment. The processing depicted in FIG. 5 may be implemented in software (e.g., code, instructions, program) executed by one or more processing units (e.g., processors, cores), hardware, or combinations thereof. The software may be stored in memory (e.g., on a non-transitory computer-readable storage medium such as a memory device). The particular series of processing steps depicted in FIG. 5 is not intended to be limiting. It is appreciated that the processing steps may be performed in an order different from that depicted in FIG. 5, and that not all steps depicted in FIG. 5 need to be performed. In one embodiment, the processing depicted in FIG. 5 is performed by model generator subsystem 120 depicted in FIGS. 1 and 2.

The processing in flowchart 500 is initiated, at 502, when model generator subsystem 120 receives application requirements information in the form an image of a GUI screen for the application. For example, the received image may be image 104 depicted in FIG. 1, which is to be processed during the generation of GUI model 124 depicted in FIG. 1. If the application is a mobile application, image 104 may depict a GUI screen of the application. If the mobile application's GUI comprises multiple GUI screens, image 104 may be one of a sequence of images that is received by model generator subsystem 120 during the generation of GUI model 124.

Figure 11:
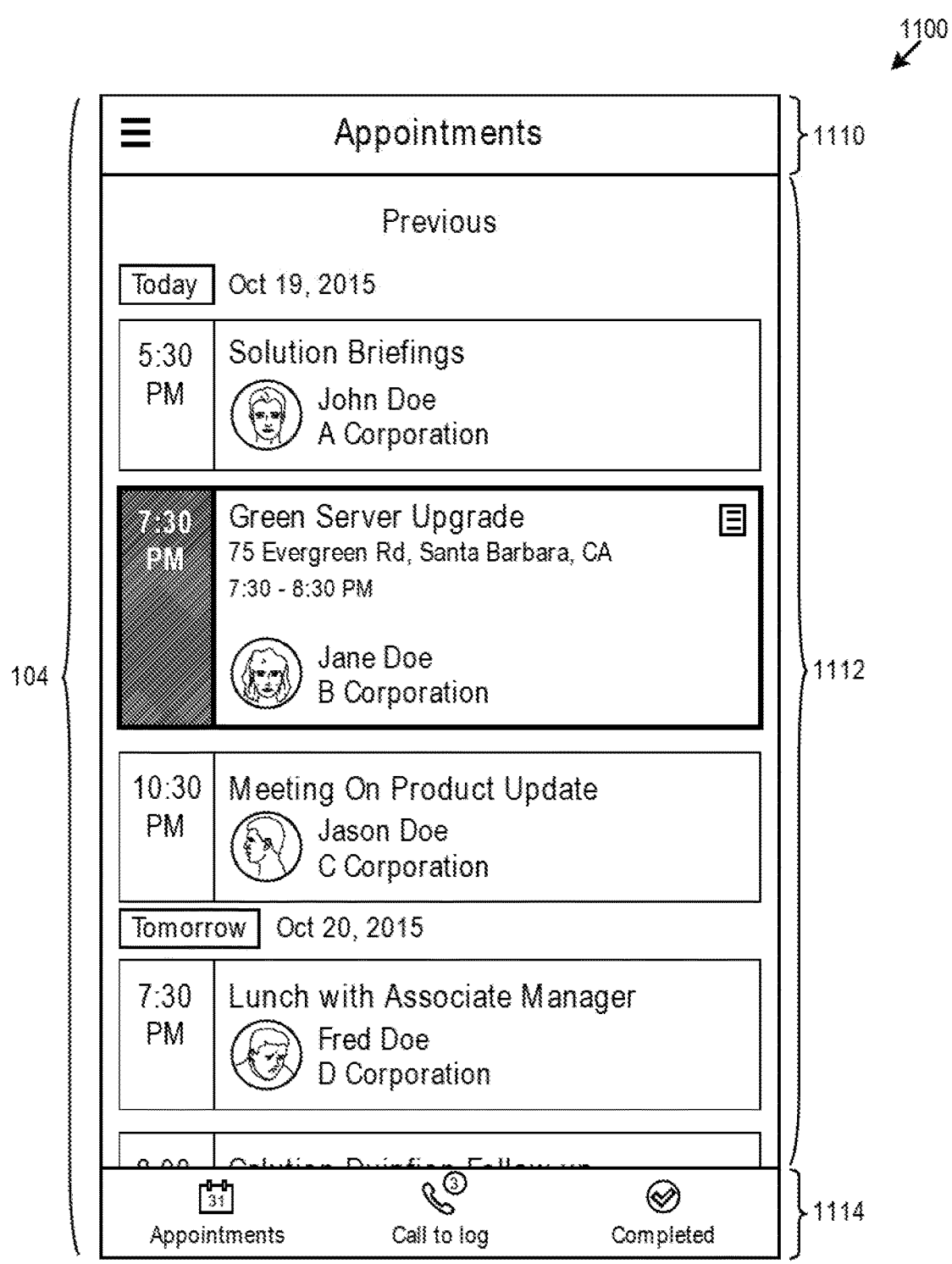
FIG. 11 depicts an example of an image of a GUI comprising a header, a body, and a footer according to certain embodiments.

An example input image 1100 is depicted in FIG. 11. As can be seen in FIG. 11, image 104 displays a GUI screen that comprises three sections including: a header 1110, a body 1112, and a footer 1114.

Returning to FIG. 5, at 504, the image is partitioned into a plurality of partitions. For example, image partitioner subsystem 202 may partition image 104 into a header partition comprising a top portion of image 104 that displays header 1110, a body partition comprising a middle portion of image 104 that displays body 1112, and a footer partition comprising a bottom portion of image 104 that contains footer 1114. FIG. 12 displays an exemplary result of partitioning image 104 into the following partitions: partition 1210, partition 1212, and partition 1214.

Returning to FIG. 5, at 506, for each partition that is determined in 504, a set of rules that is specific to the partition (i.e., partition specific rules) is determined for the partition. For example, rules determiner subsystem 204 may select, from rules 212, a set of rules specific to header partitions for processing partition 1210, a set of rules specific to body partitions for processing partition 1212, and a set of rules specific to footers for processing partition 1214.

For each partition determined in 504, processing in 508, 510, and 512 may be performed according to the set of partition specific rules determined for the partition in 506. Although the high-level steps of processing a partition are depicted to be similar across different partitions in flowchart 500, in practice, partition specific rules may cause the processing of one partition to proceed very differently from that of other partitions. For example, 508 may involve the creation of a segment hierarchy when applied to a body partition and not when applied to a header partition or a footer partition.

At 508, a physical layout is determined for a partition. At a high level, the physical layout of a partition may correspond to how GUI components and other features contained within the partition are visually laid out in the partition. The physical layout of certain partitions may comprise a segment hierarchy, which describes how GUI components and segments are hierarchically organized in the partition. The technique of determining a physical layout of a partition may involve the step of detecting regions of features (which comprise a region of pixels) that likely correspond to a GUI component and the step of segmenting the partition into one or more segments. This technique is discussed in greater detail below in reference to FIGS. 6-8.

At 510, one or more GUI components that correspond to a feature in a partition are determined for the partition. A GUI component may be defined as an interactive graphical element placed within a GUI that can receive input from a user (e.g., a selection, typed text, a mouse click) and cause logic underlying the GUI to produce a visual feedback that can be appreciated by the user as well as an invocation of logic that is associated with or assigned to the GUI component (i.e., a GUI function). Generally, most GUI components may be grouped into GUI components that are commonly found in contemporary applications such as text buttons, image buttons, drop down lists, radio buttons, text edit fields, switch buttons. The technique of determining GUI components from the features in a partition is discussed in greater detail below in reference to FIGS. 6-7.

At 512, one or more GUI functions to assign to the one or more GUI components in a partition are determined for the partition. The technique of determining GUI functions to assign to GUI components is discussed in greater detail below in reference to FIGS. 6-7. It should be noted that for certain GUI components that have a pre-defined GUI functions (e.g., GUI components that are associated with a domain), the assignment of a GUI function to these GUI components may be skipped.

At 514, a GUI model is generated from outputs of processing each partition in 508-512. When the last partition determined in 504 is processed, a model producer may use the multiple outputs to generate a GUI model for the GUI. For example, model producer subsystem 206 may receive the output of processing partition 1210, the output of processing partition 1212, and the output of processing partition 1214 from partition analyzer subsystem 205. Model producer subsystem 206 may then generate GUI model 124 based on multiple partition specific outputs.

At 516, one or more GUI implementations are generated based on the GUI model. One or more code generators may receive the GUI model. Each of the code generators may then use information contained within the GUI model to generate a GUI implementation. For example, code generator subsystem 126 may receive GUI model 124 from model generator subsystem 120 and generate GUI implementation 110 based on the GUI model.

As can be seen in flowchart 500, the code generator may generate, for an application, an implementation that covers at least part of the application's intended feature set using just images of the application. Manual input may then be used to fill gaps in the implementation's source code so that the implementation completely covers the application's intended feature set. Thus, by automating a substantial part of the work involved in creating a GUI model from one or more images, the present embodiments may reduce the time and expense needed to develop applications. Additionally, it should be noted that none of the images received in flowchart 500 are described to be manually augmented with metadata. Although the provision of metadata about the application and/or the images may further improve the accuracy of the generated implementation, such metadata may be optional.

Figure 6:
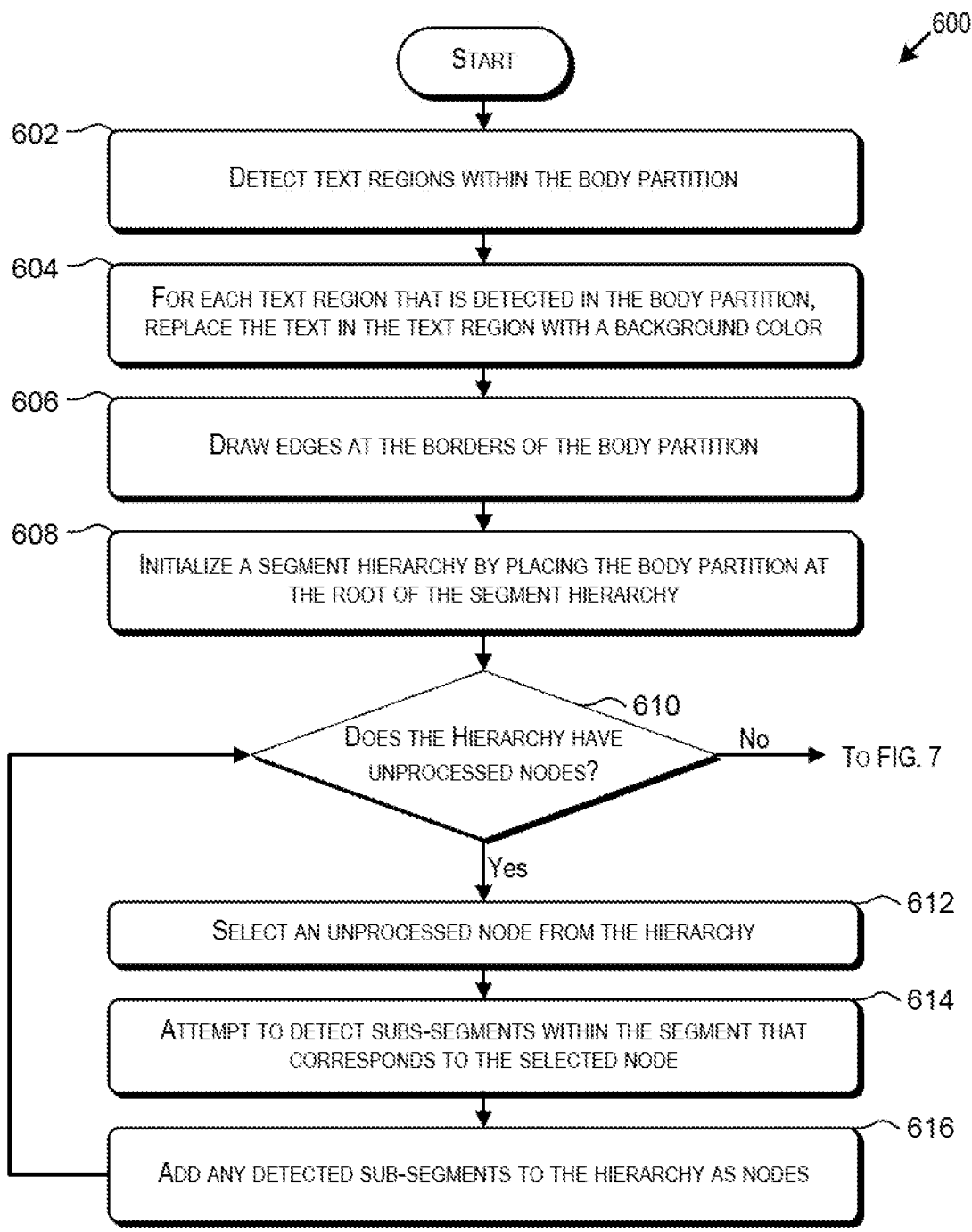
FIGS. 6-7 depict simplified flowcharts depicting the processing of a body partition according to certain embodiments.
Figure 7:
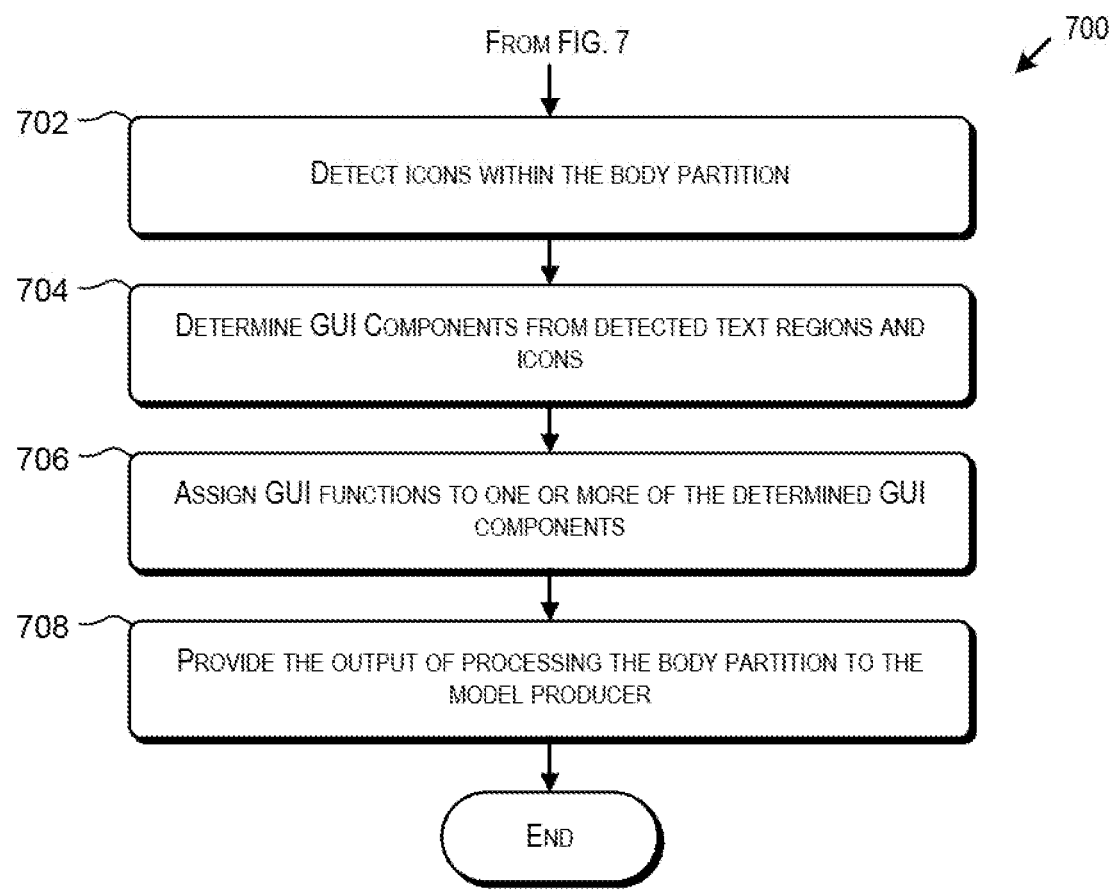

FIGS. 6 and 7 depict simplified flowcharts 600 and 700 depicting processing performed by a model generator to process a body partition of an image according to an embodiment. The processing depicted in FIGS. 6 and 7 may be implemented in software (e.g., code, instructions, program) executed by one or more processing units (e.g., processors, cores), hardware, or combinations thereof. The software may be stored in memory (e.g., on a non-transitory computer-readable storage medium such as a memory device). The particular series of processing steps depicted in FIGS. 6 and 7 are not intended to be limiting. It is appreciated that the processing steps may be performed in an order different from that depicted in FIGS. 6 and 7, and that not all steps depicted in FIGS. 6 and 7 need to be performed. In one embodiment, the processing depicted in FIGS. 6 and 7 is performed by partition analyzer subsystem 205 depicted in FIG. 2.

Prior to the start of processing performed in flowcharts 600 and 700, an image (e.g., image 104) of a GUI screen may be partitioned into a header partition (e.g., partition 1210), a body partition (e.g., partition 1212), and a footer partition (e.g., partition 1214). The processing of the body partition may be performed by partition analyzer subsystem 205. The processing of the header partition is discussed in further detail below in reference to FIG. 9. The processing of the footer partition is discussed in further detail below in reference to FIG. 10.

The processing in flowcharts 600 and 700 is initiated at 602, where text regions are detected in the body partition. To improve the accuracy of the segmentation performed in 608-616, the partition analyzer may attempt to temporarily erase visual features of the body partition that are likely to interfere with segmentation. In particular, visible text in the body partition may interfere with segmentation because the lines that form text characters may interfere with an edge detection technique used to detect segments. Thus, the partition analyzer may scan the pixels of the body partition using an optical character recognition (OCR) technique to detect words and their bounding boxes in the body partition. In some embodiments, an extension of a design tool (e.g., GIMP, Photoshop) may be used to extract text regions from the body partition as layers. Any detected text regions may be used to determine GUI components within the body partition at 704.

At 604, for each text region that is detected in the body, the text in the text region is replaced with a background color. In particular, a feature detector (e.g., feature detector subsystem 310) may re-color character pixels with a colors sampled from nearby background pixels. Accordingly, all visible text may be removed from the body partition. In some embodiments, the removal of text and other features from the body partition may be optional as long as the features are not likely to interfere with the segmentation process.

At 606, edges are drawn at the borders of the body partition. In embodiments where the segmentation process relies on determining closed contours, adding visible edges to borders of the body partition where there are none may facilitate the detection of top-level segments. Thus, a segmenter (e.g., segmenter subsystem 316) may draw visible edges at those borders to create temporary closed contours that correspond to top-level segments. The technique of detecting segments from edges and closed contours is discussed in further detail below in reference to FIG. 8. If the borders of the body partition are apparent due to a visible difference/transition between the background color within the body partition and the background color external to the body partition, the edges of the body partition may be determined via a canny edge detection process.

At 608, a segment hierarchy is initialized by placing the body partition at the root of the segment hierarchy. In particular, the segmenter may initialize a tree data-structure with a root node that corresponds to the body partition. In 610-616, the segmenter generates the segment hierarchy using recursive or iterative segmentation, where 612-616 are repeated until the condition specified in 610 is satisfied. At 610, the segmenter determines whether the segment hierarchy initialized at 608 has unprocessed nodes. If it is determined that the segment hierarchy does not comprise any nodes that have not been processed, the process proceeds to FIG. 7, which describes one or more additional steps for processing the body partition. On the other hand, if it is determined that the segment hierarchy comprises nodes that have not been processed, the segmenter may select an unprocessed node from the segment hierarchy and process it. For example, if 608 was just completed, the segment hierarchy will comprise a single unprocessed node, the root node. Accordingly, the segmenter may select the root node to process it.

At 612, in response to determining that the segment hierarchy comprises at least one unprocessed node, an unprocessed node is selected from the hierarchy for processing. If the segment hierarchy comprises more than one unprocessed nodes, an unprocessed node may be selected at random or based on some criteria. In certain embodiments, shallower unprocessed nodes may be processed before deeper unprocessed nodes.

At 614, an attempt is made to detect sub-segments within the selected node. In certain embodiments, the segmentation of a segment of a partition (or the partition itself) may be directed by the set of rules associated with the partition. The set of rules may cause the segmenter to use one or more detection techniques in scanning the pixels of the segment. The one or more detection techniques are described in further detail below in reference to FIG. 8. The sub-segments of the body partition may be referred to as top-level segments while segments that do not contain sub-segments may be referred to as bottom-level segments.

At 616, any detected sub-segments of the segment that is currently being processed have corresponding nodes added to the segment hierarchy. More specifically, for each sub-segment that is detected in 614, the segmenter creates a node that corresponds to the sub-segment and adds that node to the segment hierarchy as a direct child of the node of the segment that is currently being processed. For example, if one or more top-level segments are detected in the body partition, the segmenter may, for each of the top-level segments, create a node that corresponds to the top-level segment and place that node into the segment hierarchy as a direct child of the root node.

Upon completing the processing of the selected node, the process returns to 610, where the segmenter again determines whether the segment hierarchy comprises an unprocessed node. If it is determined that there are no more unprocessed nodes within the segment hierarchy, then the partition analyzer concludes the segmentation process and proceeds to identifying GUI components within the body partition, which is discussed in FIG. 7. If it is determined that there are more unprocessed nodes within the segment hierarchy, where the unprocessed nodes may include the nodes that were just added in 616, the segmenter may repeat 612-616.

For example, when segmenter subsystem 316 is generating a segment hierarchy for partition 1212, the segmenter may initialize the segment hierarchy with a root node that corresponds to the body partition. Segmenter subsystem 316 then selects the root node as the first unprocessed node and attempts to detect sub-segments within partition 1212. FIG. 15 depicts a plurality of top-level segments, segments 1502, 1504, 1506, 1508, 1510, and 1512 which are detected from partition 1212. As can be seen in FIG. 15, each of the top-level segments are bounded by a closed contour, a color transition, or some other type of feature that visibly separates the segment from the rest of the partition. For each of segments 1502, 1504, 1506, 1508, 1510, and 1512, segmenter subsystem 316 creates a node that corresponds to the segment and adds the node to the segment hierarchy as a child of the root node that corresponds to partition 1212. Afterwards, segmenter subsystem 316 may process each of the nodes that correspond to segments 1502, 1504, 1506, 1508, 1510, and 1512.

Figure 16:
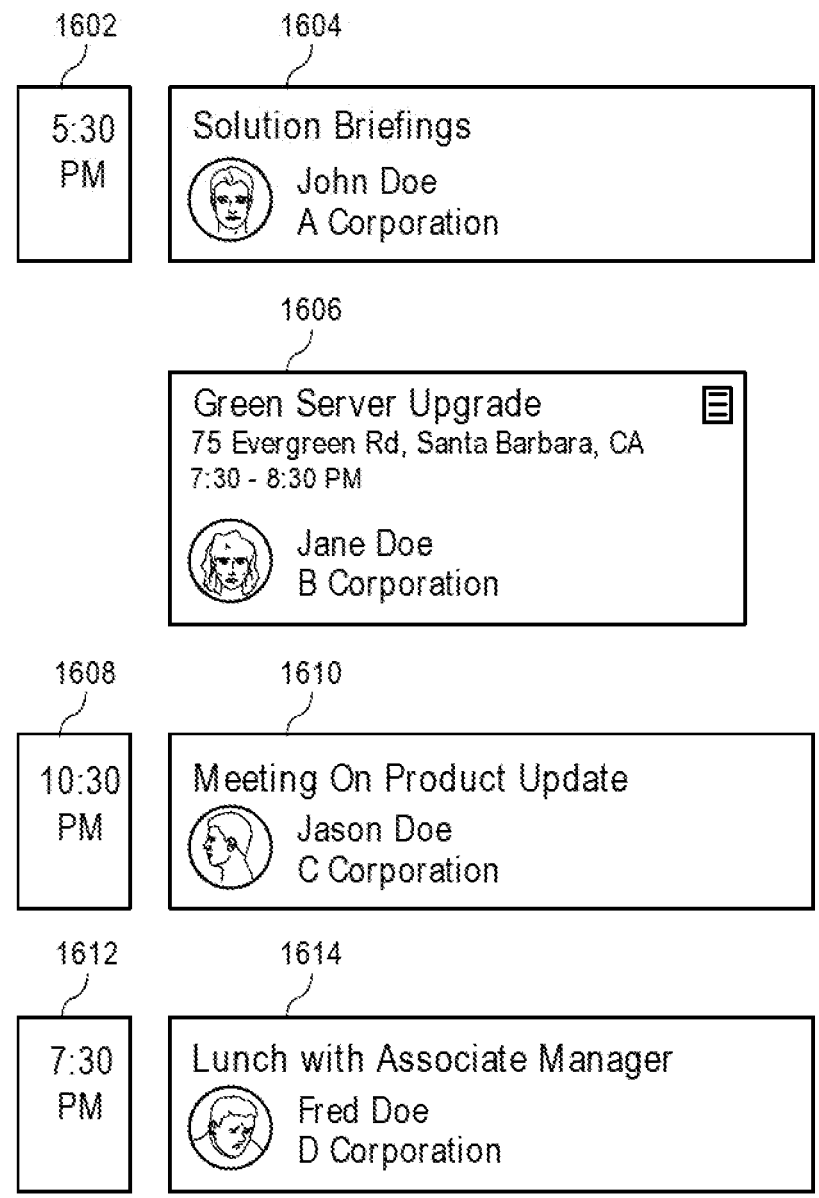

FIG. 16 depicts a plurality of segments that are sub-segments to one of the top-level segments depicted in FIG. 15. In particular, segmenter subsystem 316 may: determine segments 1602 and 1604 to be subsegments of segment 1504, determine segment 1606 to be a subsegment of segment 1506, determine segments 1608 and 1610 to be subsegments of segment 1508, and determine segments 1612 and 1614 to be subsegments of segment 1510. As can be seen in FIG. 16, each of segments 1602, 1604, 1606, 1608, 1610, 1612, and 1614 are bounded by a closed contour, a color transition, or some other type of feature that visibly separates the segment from the rest of their respective parent segments. For each of segments 1602 and 1604, segmenter subsystem 316 creates a node that corresponds to the segment and adds the node to the segment hierarchy as a child of the node that corresponds to 1504. For segment 1606, segmenter subsystem 316 creates a node that corresponds to the segment and adds the node to the segment hierarchy as a child of the node that corresponds to 1506. For each of segments 1602 and 1604, segmenter subsystem 316 creates a node that corresponds to the segment and adds the node to the segment hierarchy as a child of the node that corresponds to 1504. For each of segments 1608 and 1610, segmenter subsystem 316 creates a node that corresponds to the segment and adds the node to the segment hierarchy as a child of the node that corresponds to 1508. For each of segments 1612 and 1614, segmenter subsystem 316 creates a node that corresponds to the segment and adds the node to the segment hierarchy as a child of the node that corresponds to 1512. Afterwards, segmenter subsystem 316 may process each of the nodes that correspond to segments 1602, 1604, 1606, 1608, 1610, 1612, and 1614.

It should be noted that segmenter subsystem 316 is not able to detect any sub-segments while processsing segments 1502 and 1510. Additionally, segmenter subsystem 316 may detect only one sub-segment in segment 1506 because the first column of segment 1506 (i.e., the portion of segment 1506 containing the text "7:30 PM") has the same background color as the border of segment 1506. However, this example is not intended to be limiting as other embodiments may determine two sub-segments in segment 1506. In the example depicted in FIGS. 15-16, however, after GUI model 124 is generated, model generator subsystem 120 may receive user input that may change the GUI model to specify two sub-segments within segment 1506 instead of one sub-segment. In response, model generator subsystem 120 may update rules 212 to improve the accuracy of segmenter subsystem 316.

Proceeding to FIG. 7, at 702, icons are detected within the body partition. A feature detector (e.g., feature detector subsystem 310) may use a blob detection and image recognition technique or another optical recognition technique to scan for icons that are likely to correspond to a GUI component. The process of detecting such icons is discussed in further detail below with respect to FIG. 9. Any detected icons may be used for determining GUI components within the body partition in 704.

At 704, GUI components within the body partition may be determined from detected text regions and icons. To determine a GUI component that corresponds to a detected feature (e.g., a text region or an icon), a component identifier (e.g., component identifier subsystem 312) may involve associating the feature with one of the GUI components known by the model generator (e.g., known GUI components 214). The process of associating detected features with identified GUI components is discussed in further detail below with respect to FIG. 9.

At 706, GUI functions may assigned to one or more of the determined GUI components. The process of identifying GUI components from detected features is discussed in further detail below with respect to FIG. 9.

At 708, the output of processing the body partition is provided to the model producer. The model producer may then combine the output of processing the body partition with outputs from processing the rest of the partitions of the image (and output from processing partitions of other images) to generate the GUI model.

Figure 8:
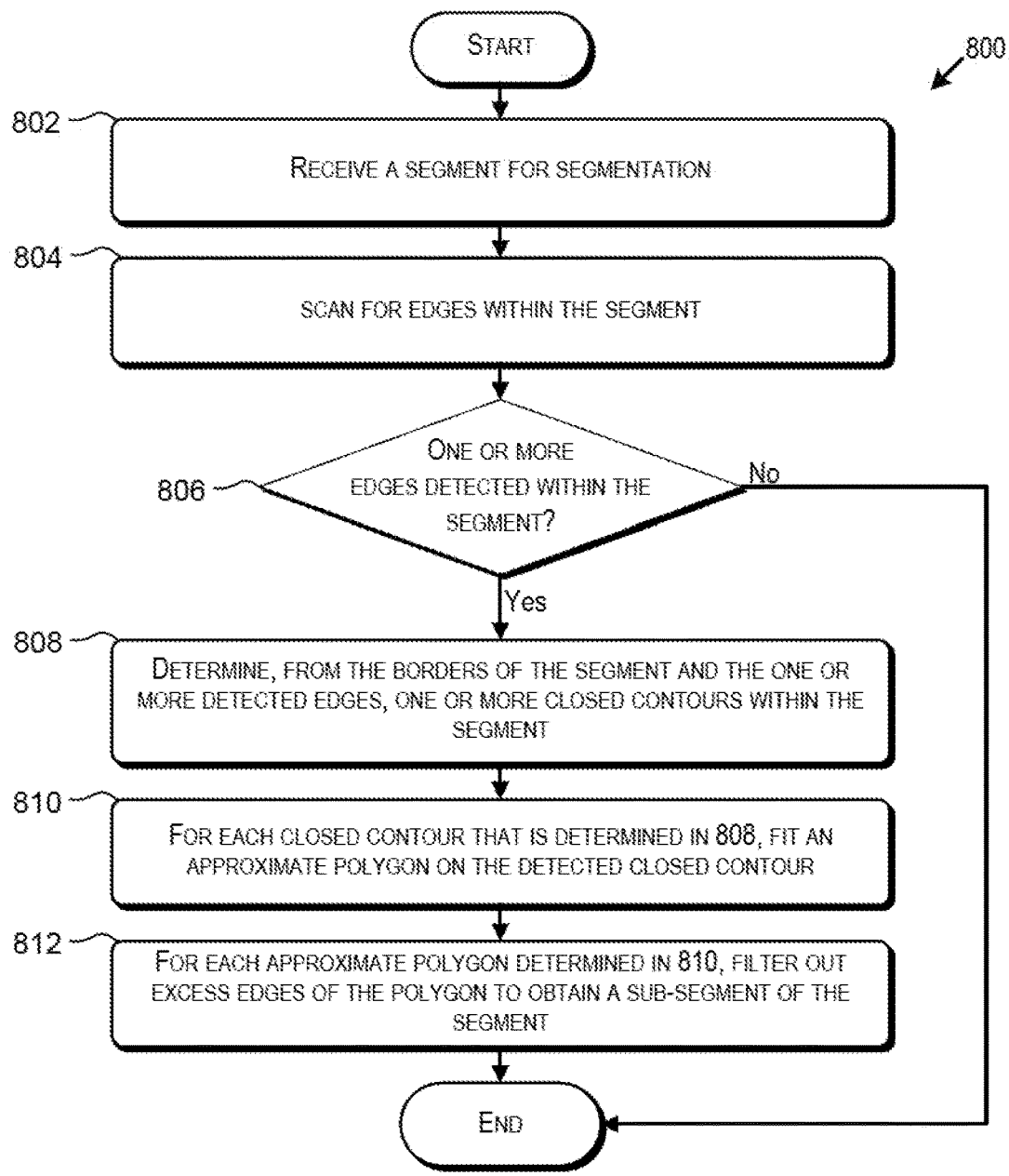
FIG. 8 depicts a simplified flowchart depicting processing performed for segmenting a segment in a partition according to certain embodiments.

FIG. 8 depicts a simplified flowchart 800 depicting processing performed by a segmenter to perform segmentation upon a segment according to an embodiment. The processing depicted in FIG. 8 may be implemented in software (e.g., code, instructions, program) executed by one or more processing units (e.g., processors, cores), hardware, or combinations thereof. The software may be stored in memory (e.g., on a non-transitory computer-readable storage medium such as a memory device). The particular series of processing steps depicted in FIG. 8 is not intended to be limiting. It is appreciated that the processing steps may be performed in an order different from that depicted in FIG. 8, and that not all steps depicted in FIG. 8 need to be performed. In one embodiment, the processing depicted in FIG. 8 is performed by segmenter subsystem 316 depicted in FIG. 2.

At 802, a segment is received for segmentation. For example, segmenter subsystem 316 may be in the process of generating a segment hierarchy for partition 1212 and may have selected an unprocessed node that corresponds to segment 1504 for segmenting.

At 804, the segment is scanned for edges within the segment. For example, canny edge detection or some other edge detection operator may be used to detect changes in background color or borders within the segment. For example, segmenter subsystem 316 may detect, within segment 1504, the change in background color between the left column that contains "5:30 PM" and the right column that contains "Solution Briefings" and identify the change in background color as an edge.

At 806, a determination is made as to whether one or more edges have been detected within the segment. It should be noted that the borders of the segment (e.g., the top, bottom, right, and left borders of the segment) are considered to have already been detected (or in the case where the body partition is being segmented, were temporarily added) and thus are not figured into the determination. If the segmenter determines that no edges were detected, then the segmenter would determine that the segment has no sub-segments. If the segmenter determines that one or more edges have been detected within the segment, the segmenter may proceed to determine sub-segments within the segment. For example, because segmenter subsystem 316 has detected an edge within segment 1504, the segmenter may proceed to determine sub-segments within segment 1504.

At 808, one or more closed contours may be determined from the borders of the segment and the one or more detected edges. A closed contour may be defined as one or more line segments (which may be straight or curved) closing in a loop to form a closed chain or circuit. Examples closed contours may include, without restriction, polygons and circles. To determine a closed contour from the detected edges and the segment's borders, a segmenter may select a number of edges and borders that, when combined, loop around to form a closed contour. For example, segmenter subsystem 316 may determine a first closed contour using the detected edge, the top border of segment 1504, the bottom border of segment 1504, and the left border of segment 1504. Segmenter subsystem 316 may also determine a second closed contour using the detected edge, the top border of segment 1504, the bottom border of segment 1504, and the right border of segment 1504.

At 810, for each closed contour that is determined in 808, the segmenter may fit an approximate polygon on the detected closed contour. To approximate a rectangular segment onto a detected closed contour, the segmenter may approximate curves into straight lines. In particular, the segmenter may use the Ramer-Douglas-Peucker algorithm (RDP) or another algorithm for reducing the number of points in a curve that is approximated by a series of points.

At 812, for each approximate polygon that is determined in 810, the segmenter may filter out excess edges of the polygon to obtain a sub-segment of the segment. In particular, any approximated polygon that has more than four edges may have excess edges filtered out to obtain a rectangle. In some embodiments, a margin of error may be incorporated to account for curved borders. The resulting rectangle is the sub-segment. For example, because the closed contours in segment 1504 are already rectangles, 810-812 may be skipped in this example. Accordingly, segmenting segment 1504 yields sub-segments 1602 and 1604 as depicted in FIG. 16.

Figure 17:
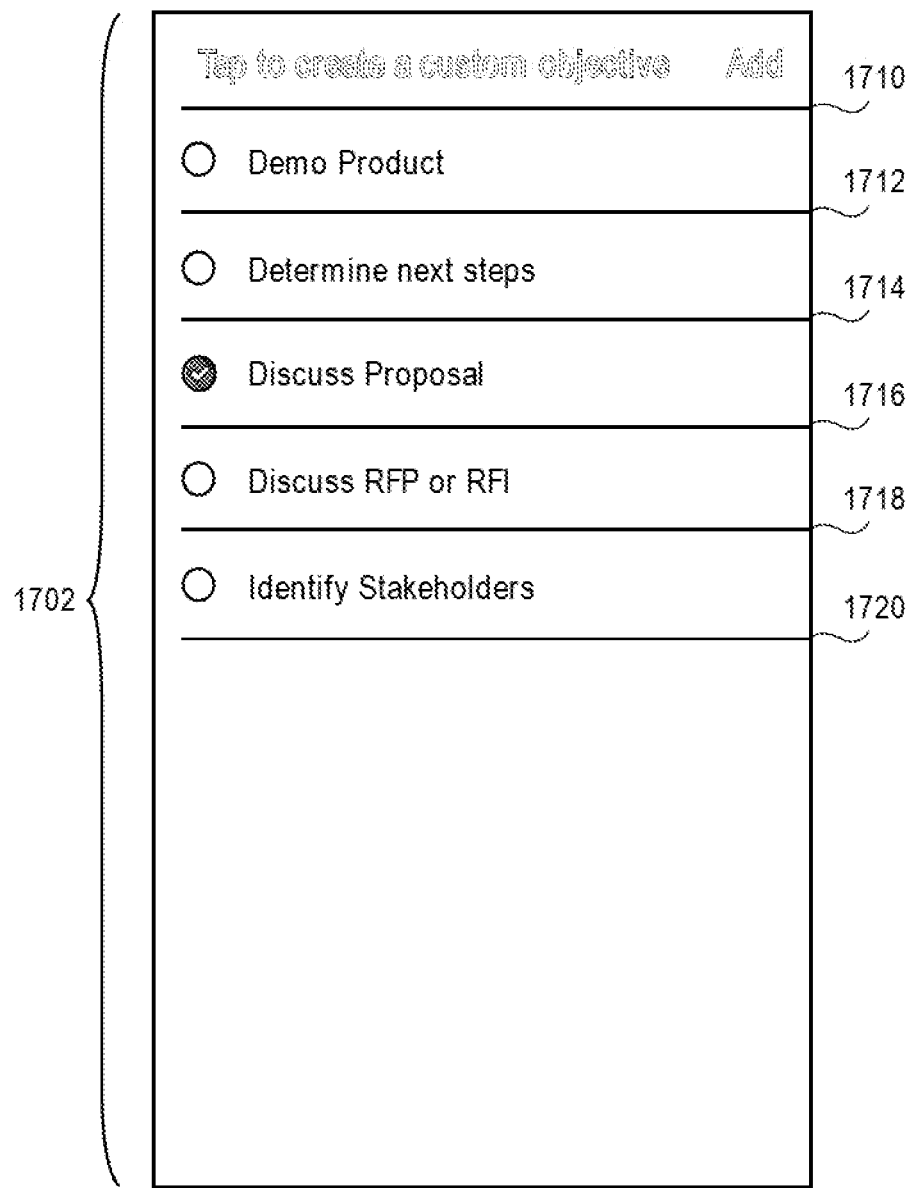
FIG. 17 depicts an example of a list component that is segmented according to certain embodiments.
Figure 19A:
Figure 19B:

It should be noted that when processing images of applications configured for certain platforms (e.g., Android platform, iOS platform), a segmenter may encounter edges that nearly but do not completely extend from one border of an encompassing segment to the other. However, such incomplete edges can be considered complete edges with regards to the segmentation process. FIG. 17 displays partition 1702, which comprises incomplete edges 1710, 1712, 1714, 1716, 1718, and 1720. Each of the edges encompassed by partition 1702 extends far enough to touch the right order and almost far enough to touch the left border where there are not features (i.e., only background pixels) between the end of the incomplete edge and the left border. In certain embodiments, the Hough transform or some other feature extraction technique may be used to determine whether an incomplete edges can be considered a complete edge with regards to the segmentation process.

It should be noted that the Hough transform may also be used to identify circular features that may correspond to segments. Although circular features are less common than rectangular features, such circular features may be implemented in a GUI screen using rectangular segments.

Figure 9:
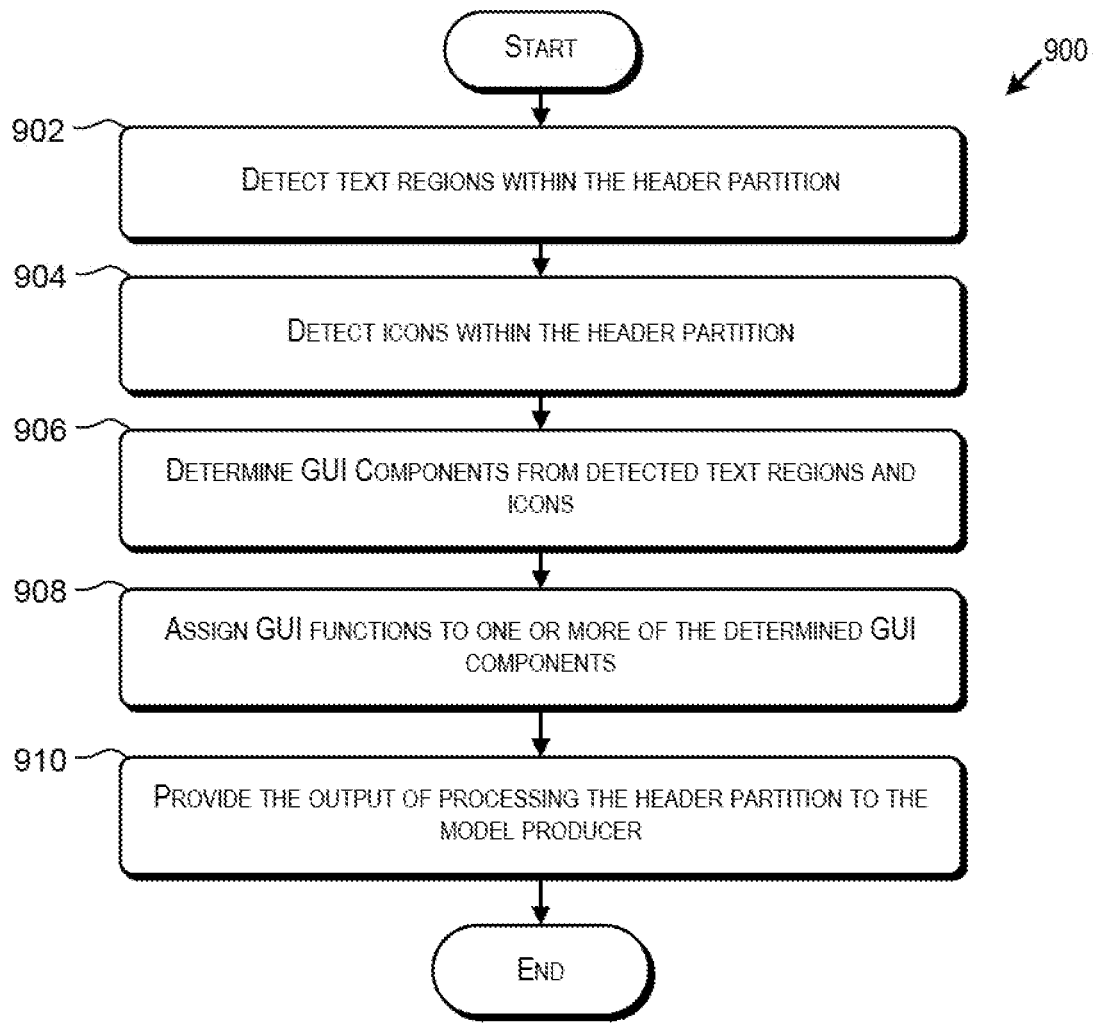
FIG. 9 depicts a simplified flowchart depicting the processing of a header partition according to certain embodiments.

FIG. 9 depicts a simplified flowchart 900 depicting processing performed by a model generator to process a header partition of an image according to certain embodiments. The processing depicted in FIG. 9 may be implemented in software (e.g., code, instructions, program) executed by one or more processing units (e.g., processors, cores), hardware, or combinations thereof. The software may be stored in memory (e.g., on a non-transitory computer-readable storage medium such as a memory device). The particular series of processing steps depicted in FIG. 9 is not intended to be limiting. It is appreciated that the processing steps may be performed in an order different from that depicted in FIG. 9, and that not all steps depicted in FIG. 9 need to be performed. In one embodiment, the processing depicted in FIG. 9 is performed by partition analyzer subsystem 205 depicted in FIG. 2.

The processing in flowchart 900 is initiated at 902, where text regions are detected within the header partition. A feature detector (e.g., feature detector subsystem 310) may scan the pixels of the header partition using an optical character recognition (OCR) technique to detect words and their bounding boxes in the header partition. In some embodiments, an extension of a design tool (e.g., GIMP or Photoshop) may be used to extract text regions from the header partition as layers. Any detected text regions may be used later to determine GUI components within the header partition at 906.

At 904, icons are detected within the header partition. The feature detector may use a blob detection technique or other optical recognition techniques to scan for icons that are likely to correspond to a GUI component.

In certain embodiments, a feature detector may recognize an icon based on whether the pixels of the icon together exceed a certain threshold of corresponding to a GUI component. Whether the threshold is surpassed may depend on the partition being scanned, visual characteristics created by the pixels, and the position of the pixels within the partition. For instance, because header partitions are generally narrow, the feature detector may assume that there can only be a single row of icons. Thus, if a feature detector that is processing a header partition detects multiple icons within the same vertical region, the feature detector may merge the multiple icons into a single icon, where the single icon may be used to identify a GUI component.

Figure 13A:
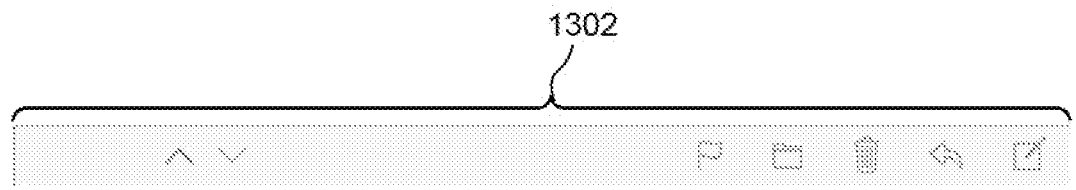
FIGS. 13A-D depict an example of a header partition that is processed according to certain embodiments.
Figure 13B:
Figure 13C:
Figure 13D:

In certain embodiments, a feature detector may use a technique based on Maximally stable extremal regions (MSER) to detect icons that are of a similar color to the surrounding background color. FIGS. 13A, 13B, 13C, and 13D depict different stages of a feature detector processing a header partition. As can be seen in FIG. 13A, partition 1302 corresponds to a header partition that comprises icons 1310, 1312, 1314, 1316, 1318, 1320, and 1322. Note that icon 1312 has an especially similar color to the background color of the partition. FIG. 13B depicts a feature detector performing blob detection on partition 1302. As shown in FIG. 13B, the blob detection technique fails to capture icon 1312 because the icon is of a color that is similar to that of the background. FIG. 13C depicts the feature detector performing an MSER-based technique on partition 1302, which causes each of the icons to be colored with a color that contrasts with the background color of partition 1302. FIG. 13D depicts partition 1302 undergoing blob detection again, except this time, all of the icons are detected. Any detected icons (e.g., icons 1310, 1312, 1314, 1316, 1318, 1320, and 1322) may be used for determining GUI components within the partition.

At 906, GUI components with the header partition are determined from the detected text regions and icons. As described above, determining a GUI component that corresponds to a feature may involve associating the feature with one of the domains known by the model generator and/or one of the GUI components known by the model generator (e.g., known GUI components 214).

For example, certain single-character text regions can be identified as image buttons based on the character displayed in the region. Additionally, any text region in the header that is not located in the center of the header may be identified as a text button because, as commonly seen in mobile applications, (1) any text region located in the center of the header can be assumed to be the title of the GUI screen and (2) aside from the title, any text found in headers can be assumed to correspond to text buttons. Furthermore, a text region in the header partition that contains exactly one of the characters 'x', '+', '<', and '>' may be identified as an image button because the text region likely corresponds to an icon that looks similar to a character (and was thus recognized as a text region during the OCR process).

UI components of certain types may be more easily detected than others. In particular, certain types of GUI components (e.g., radio buttons, switch buttons, drop down lists) may possess certain visual characteristics or distinguishable arrangement of features (i.e., visual indicators) that are more readily identifiable regardless of the GUI's style (e.g., color, design, etc.). For example, drop down lists may be more readily identifiable than text buttons or image buttons because they generally comprise a visual indicator: a text region next to a downward facing arrow (i.e., the drop down icon). In contrast, image buttons and text buttons may vary greatly in appearance based on the GUI's style and generally do not have any distinguishable arrangement of features. Thus, a component identifier may attempt to identify GUI components with visual indicators before other types of GUI components (e.g., text buttons, image buttons, edit texts). After identifying GUI components with visual indicators, the partition analyzer may identify other types of GUI components. In some embodiments, the absence of a visual indicator may be considered when attempting to determine a GUI component from one or more features.

FIGS. 20A-B depict an example of identifying switch button components within a partition. As can be seen in FIGS. 20A and 20B, partition 2002 comprises features 2010, 2012, 2014, and 2016. To determine whether the features correspond to switch buttons, the component identifier may retrieve a template of a switch button for the switch button component from memory (e.g., known GUI components 214). In general, a model generator may store templates of GUI components in the memory and match these templates to detected features. The stored templates may account for different styles. For example, a model generator may store a switch button template for matching switch buttons on the Android platform and another switch button template for matching switch buttons on the iOS platform. The stored templates may account for different component states. For example, features 2010 and 2012 show different states of a switch button. Thus, the model generator may store a switch button template for each of the states of the switch button. The component identifier may identify a switch button from a feature based on whether the feature matches the switch button template.

It should be noted that to account for different sizes between the stored templates and the detected features, scale invariant matching may be used. Scale invariant matching may involve iterating over different scales of the template and attempting to match each scale to the feature until a match is found. Some embodiments may also involve any image processing technique that can directly do scale invariant matching.

FIGS. 21A-C depict an example of a component identifier identifying drop down list components within a partition. A component identifier may make several assumptions with regards to drop down lists. First, drop down lists generally comprise (1) a text region that describes the contents of the drop down list and (2) a drop down icon that indicates to the user that clicking the drop down icon may cause a drop down list to be expanded. Additionally, the drop down icon generally is located next to the end of the text region or at the end of a rectangle (e.g., a segment) that surrounds the drop down list. Next, the font of the text region may generally be smaller than that of other text regions in the image. Thus, a component identifier may identify a drop down list when it detects a downward facing arrow next to a text region with a small font. In considering the above characteristics of drop down lists, a component identifier may attempt to identify a drop down list from the text region and the downward facing arrow. In some embodiments, text regions that comprise the single character 'v' or 'V' may be matched against one or more templates of drop down icons. In some embodiments, the component identifier may take into account that some drop down lists omit some of these components (e.g., the text region that describes the contents of the drop down list) or include additional components.

As can be seen in FIG. 21A, the drop down lists in partition 2102 are contained within segment 2110, which is shown as extracted in FIG. 21B. As can be seen in FIG. 21C, segment 2110 comprises text regions 2120, 2122, 2124, and 2126. To determine whether any of these text regions correspond to a drop down list, a component identifier may examine a feature or a region next to each of the text regions. More specifically, to determine whether text region 2120 corresponds to a drop down list, the component identifier may attempt to match region 2130 2130 to one or more drop down icon templates; to determine whether text region 2122 corresponds to a drop down list, the component identifier may attempt to match region 2132 to the one or more drop down icon templates; to determine whether text region 2124 corresponds to a drop down list, the component identifier may attempt to match region 2134 to the one or more drop down icon templates; and to determine whether text region 2126 corresponds to a drop down list, the component identifier may attempt to match region 2132 2136 to the one or more drop down icon templates. In FIG. 21C, the component identifier may determine that regions 2120 and 2130 do not correspond to a drop down list, regions 2122 and 2130 correspond to a first drop down list, regions 2124 and 2134 do not correspond to a drop down list, and regions 2126 and 2136 correspond to a second drop down list.

Radio buttons may be identified from one or more features. To identify a radio button, a component identifier may consider text regions that have a smaller font and are located to the left of a circular icon. The component identifier may additionally consider multiple circular icons that are arranged in a column or a row.

Edit texts may be identified from one or more features. Accordingly, a component identifier may consider empty bottom-level segments or images of empty rectangles as candidates for identifying an edit text GUI component. The component identifier may also look for an indicator text next to a rounded box, where the indicator text has a lighter font.

Text buttons may correspond to buttons that comprise only text. In particular, a component identifier may compare the text that appears within a text region against a standard set of known words to determine whether the text region corresponds to a particular type of text button. In some embodiments, the set of known words may include words or phrases that are specific to one or more domain specific dictionaries. Additionally, the component identifier may consider a bright background color and a large font size as indications that a text region (or a segment containing a text region) corresponds to a text button.

Image buttons may correspond to buttons that comprise only an icon or buttons that comprise both text and an icon (i.e., image and text buttons). To identify an image button, a component identifier may compare the button's icon against a standard set of known icons that are retrieved from memory (e.g., known GUI components). In some embodiments, the set of known icons may include icons or images that are specific to one or more domain specific dictionaries. In some embodiments, an image and text button can be identified by merging one or more text regions with one or more icons.

Profile picture components may correspond to a GUI component that displays a profile picture or a contact photo. A component identifier may identify profile picture components via a face detection algorithm. For example, the component identifier may use cascade classification (i.e., cascading classifiers). FIGS. 18A, 18B, 19A, and 19B depict an example of a component identifier identifying profile picture components. As shown in FIG. 18A, partition 1801 comprises features 1802, 1804, 1806, and 1808, which each comprise a photo of an individual's face that is encompassed by a circle. In this example, a profile picture component may comprise not just the face, but the encompassing circle as well. Thus, for each of features 1802, 1804, 1806, and 1808, the component identifier may detect the face, which is indicated by markers 1812, 1814, 1816, and 1818 in FIG. 18B. Next, for each of the faces, the component identifier marks rectangular regions whose dimensions are a multiple (e.g., double) of the dimensions of the detected face. The resulting rectangular regions are indicated by markers 1902, 1904, 1906, and 1908 in FIG. 19A. Next, for each of the rectangular regions, the component identifier fits a circle or a square within the rectangular region to obtain an accurate extent of the profile picture component encompassed by the rectangular region. The resulting fitted circles are indicated by markers 1912, 1914, 1916, and 1918 in FIG. 19B. The fitting of the circle or the square may be performed using a Hough transform.

Lists may correspond to a set of similar elements that are arranged in a vertical column within a segment and are separated by visible edges within the segment. To identify a list within a segment, a component identifier may search for a plurality of edges (i.e., separators) that have similar or identical lengths, have similar or identical distances between each other, and cover the entire width of the segment or a large part of the width with no element between the start and end of the edge and the edge of the encompassing segment. In some embodiments, the plurality of separators may be identified using a Hough transform. Additionally, within the encompassing segment, the component identifier may look for sub-segments that have the same x-coordinates, the same width, and a similar set of GUI components occurring at approximately the same relative locations within the sub-segments. In certain embodiments, a component identifier may also look for constant components commonly included in lists, such as the presence of the character '>' at the end of the list.

It should be noted that when attempting match a detected icon to a stored template, simple template matching may be used if the sizes and rotations of the stored template and the detected icon are consistent with each other. If the sizes do not match (e.g., because the image may be scaled), scale invariant matching may be used, which involves iterating over different scales of the template and trying to match each scale with the icon. In general, if there exists icons that are similar when rotated, the matching icons may be scale invariant but rotation variant. If the requirement image is rotated on its axis, the requirement image may be rotated to align horizontally before the matching is performed. Examples of such template matching techniques may involve the Speeded Up Robust Features (SURF) algorithm, the Scale-invariant feature transform (SIFT) algorithm, or the Fast Library for Approximate Nearest Neighbors (FLANN) library.

It should be noted that the model generator may extract and store images of GUI components as templates within memory 122. In doing so, the model generator may learn about new types of GUI components or new variations of GUI components for types that are already known (e.g., a radio button GUI component for a new GUI style).

After no more GUI components can be identified from the detected features, the component identifier may designate the remaining features as static text or images.

At 908, GUI functions are assigned to one or more of the determined GUI components. In particular, a function identifier (e.g., function identifier subsystem 314) may assign, to a GUI component, a GUI function selected from a set of known GUI functions, based on the GUI component's type, one or more visual characteristics of the GUI component, the platform on which the application is to execute on, and/or the position of the GUI component within the image. Exemplary known GUI functions may include: a function for accepting or confirming an action (i.e., an accept function), a function for stopping or canceling an action (i.e., a cancel function), a function for minimizing a GUI screen (i.e., a minimize function), a function for maximizing a GUI screen or window (i.e., a maximize function), a function for backing out of a GUI screen or mode to a previous screen or mode (i.e., a back function), a function for going forward from a GUI screen or mode (i.e., a forward function), a function for opening a settings related screen or menu (i.e., a settings function), a function for adding (i.e., an add function), a function for saving a document (i.e., a save function), a function for editing a document (i.e., an edit function), a function for searching files, text, or other data (i.e., a search function), a function for adding an item via the GUI (i.e., an add function), a function for deleting an item via the GUI (i.e., a delete function), a function for launching a menu that enables the user to configure options or settings associated with the application or the GUI (i.e., an option function), a function for causing the GUI to transition to a more specific screen, mode, view, or window of the GUI (i.e., a drill-down function), and a function for causes the underlying program or application associated with the GUI to close or halt execution on the device (i.e., an exit function). It should be noted that known GUI functions may be stored by the model generator within memory 122. Memory 122 may receive new GUI functions and updates to known GUI functions 216 as the model generator processes images and receives user feedback. In particular, assigning a GUI function to a GUI component may involve associating the GUI component with metadata that indicates the component's function such as a link or a reference to a particular function.

In certain embodiments, a function identifier may consider the position of a GUI component within the image when attempting to assign a GUI function to the GUI component. For example, the function identifier may assume that a drop down menu located at the right side of the header of a GUI screen corresponds to the GUI screen's main context menu.

In general, model generator may store and learn associations between GUI functions on the one hand and various characteristics of GUI components, the GUI screen, and the application on the other (e.g., position, icons, phrases, etc.). Additionally, if the model generator does not determine a GUI function to assign to a GUI component, the GUI component is left unassigned so that a user may manually provide a role to the GUI component.

As noted above, certain GUI components (e.g., domain specific GUI components) that are determined in 906 may be inextricably linked to a particular function. When a component identifier determines a GUI component, the component identifier may additionally determine that the GUI component is preassociated with a GUI function. As a result, 908 may be skipped for this GUI component. For example, text buttons found in a GUI screen often comprise words that are commonly used across applications or in a specific domain to denote a particular meaning (e.g., "OK" means proceed, "Cancel" means stop). Certain domain-specific dictionaries may associate text buttons with the words "cancel," "reject," and "disagree" with the cancel function; the words "submit," "proceed," "OK," and "agree," with the accept function; the word "edit" with the edit function, the word "back" with the back function; the word "settings" with the settings function; and the word "save" with the save function. It should be noted the model generator may such phrases and their associations to GUI functions in memory. It should also be noted that the model generator may store new phrases and associations in memory as the model generator encounters them.

As another example, image buttons found in a GUI screen often comprise icons that are commonly used across applications or in a specific domain to denote a particular function (e.g., a green checkmark icon means proceed, a stop sign icon means stop). Certain domain-specific dictionaries may associate an 'X' icon with the exit/close function, a '+' icon with the add function, a '>' icon with the drill-down function, a '<' icon with the back function, a hamburger icon with the function to open a navigator, a gear icon with the settings functions, a checkmark icon with the accept function, and a stop sign icon with the cancel function. It should be noted that the model generator may store such icons and their associations to GUI functions in memory. It should also be noted that the model generator may store new icons and associations in memory as the model generator encounters them.

At 910, output of processing the header partition is provided to the model producer. The model producer may then combine the output of processing the header partition with outputs from processing the rest of the partitions of the image (and output from processing partitions of other images) to generate the GUI model.

Figure 10:
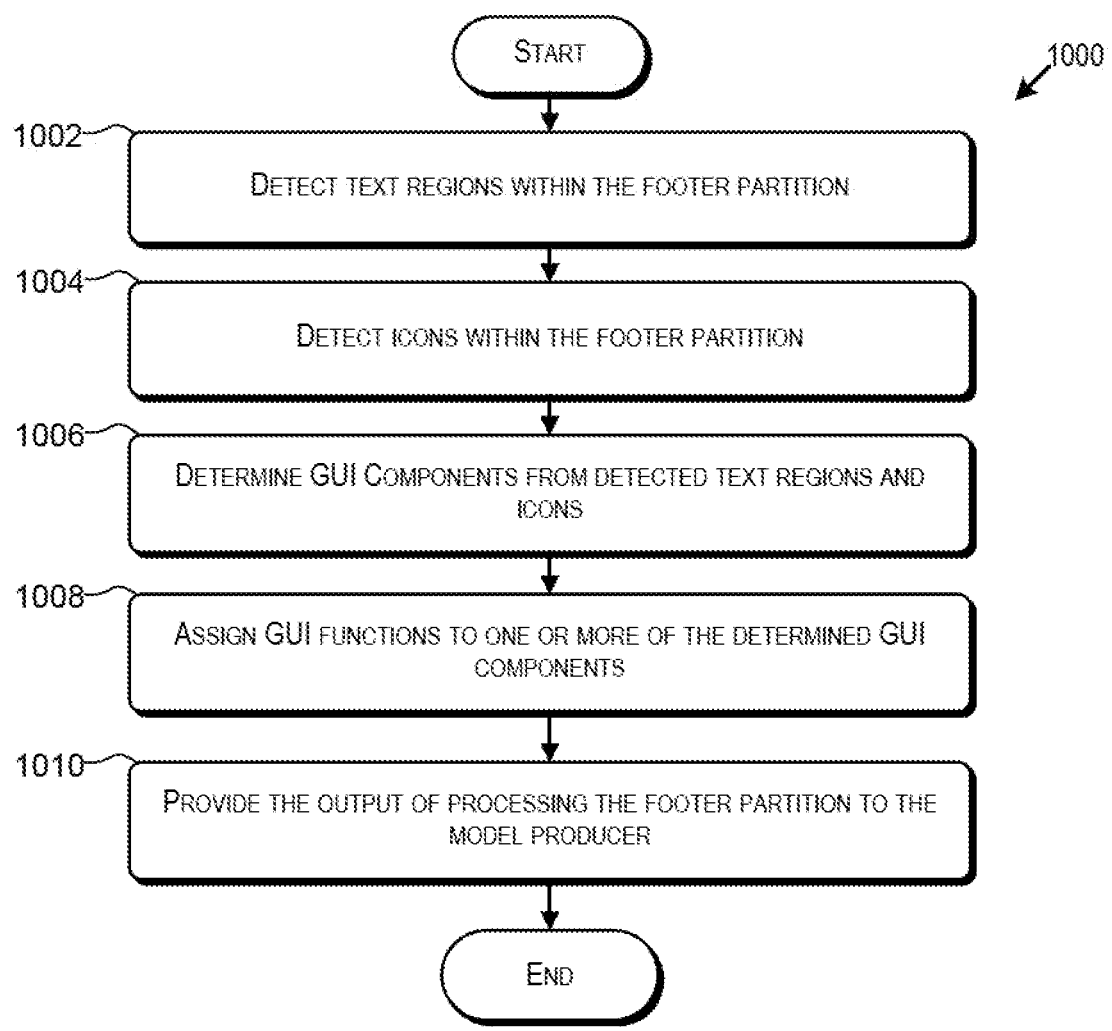
FIG. 10 depicts a simplified flowchart depicting the processing of a footer partition according to certain embodiments.

FIG. 10 depicts a simplified flowchart 1000 depicting processing performed by a model generator to process a footer partition of an image according to certain embodiments. The processing depicted in FIG. 10 may be implemented in software (e.g., code, instructions, program) executed by one or more processing units (e.g., processors, cores), hardware, or combinations thereof. The software may be stored in memory (e.g., on a non-transitory computer-readable storage medium such as a memory device). The particular series of processing steps depicted in FIG. 10 is not intended to be limiting. It is appreciated that the processing steps may be performed in an order different from that depicted in FIG. 10, and that not all steps depicted in FIG. 10 need to be performed. In one embodiment, the processing depicted in FIG. 10 is performed by partition analyzer subsystem 205 depicted in FIG. 2.

Figure 14A:
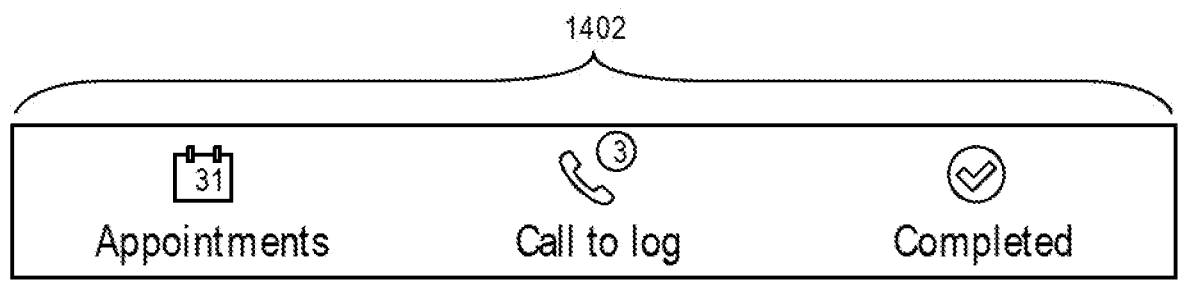
FIGS. 14A-B depict an example of a footer partition that is processed according to certain embodiments.
Figure 14B:
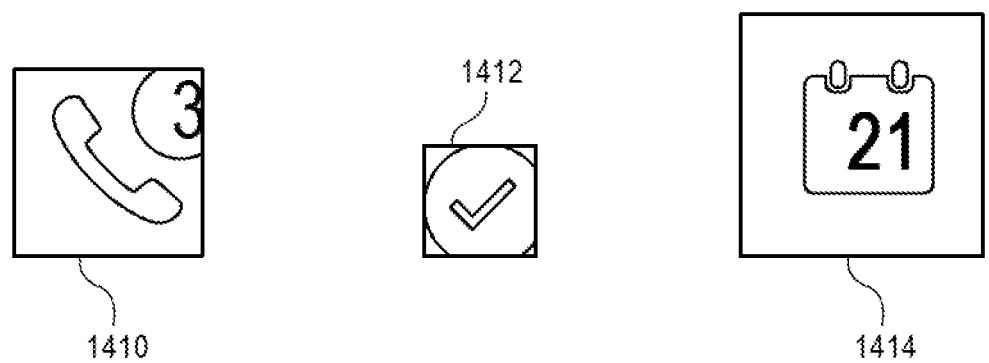

The processing in flowchart 1000 is initiated at 1002, where text regions are detected within the footer partition. At 1004, icons are detected within the footer partition. FIGS. 14A-14B depict the detection of icons using a process similar to what was described in reference to FIGS. 13A-13D. FIG. 14A depicts a footer that has been extracted as partition 1402 from an image of a GUI. As shown FIG. 14B, feature detector subsystem 310 detects icons 1410, 1412, and 1414 using the similar process. Icons 1410, 1412, and 1414 may later be used for detecting GUI components within the partition 1402.

Returning to FIG. 10, at 1006, GUI components in the footer partition are determined from the detected text regions and icons. At 1008, GUI functions are assigned to one or more of the determined GUI components. At 1010, output of processing the footer partition is provided to the model producer. The model producer may then combine the output of processing the footer partition with outputs from processing the rest of the partitions of the image (and output from processing partitions of other images) to generate the GUI model.

Figure 22:
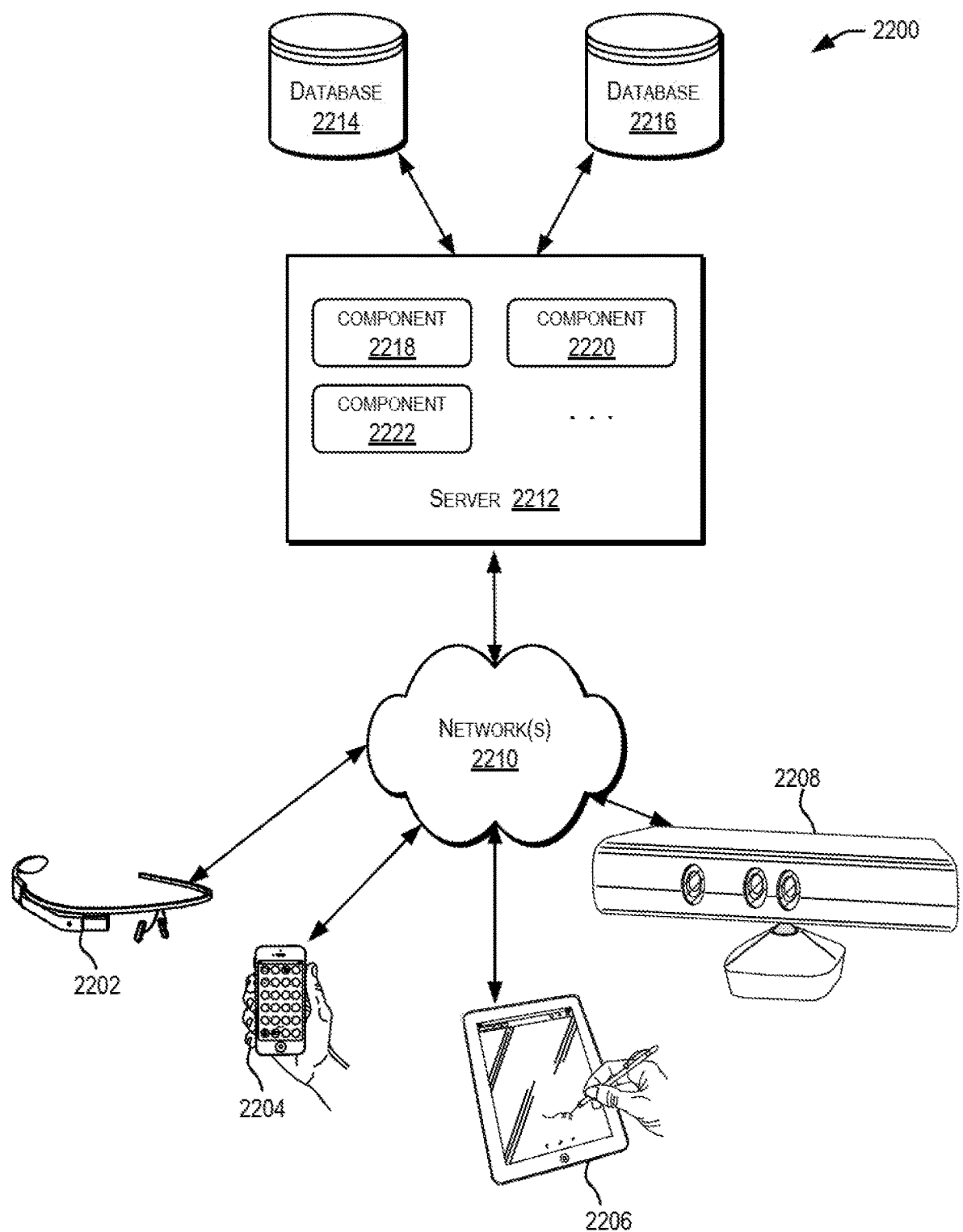
FIG. 22 depicts a simplified diagram of a distributed system for implementing an embodiment.

FIG. 22 depicts a simplified diagram of a distributed system 2200 for implementing an embodiment. In the illustrated embodiment, distributed system 2200 includes one or more client computing devices 2202, 2204, 2206, and 2208, which are configured to execute and operate a client application such as a web browser, proprietary client (e.g., Oracle Forms), or the like over one or more network(s) 2210. Server 2212 may be communicatively coupled with remote client computing devices 2202, 2204, 2206, and 2208 via network 2210.

In various embodiments, server 2212 may be adapted to run one or more services or software applications. In certain embodiments, server 2212 may also provide other services or software applications can include non-virtual and virtual environments. In some embodiments, these services may be offered as web-based or cloud services or under a Software as a Service (SaaS) model to the users of client computing devices 2202, 2204, 2206, and/or 2208. Users operating client computing devices 2202, 2204, 2206, and/or 2208 may in turn utilize one or more client applications to interact with server 2212 to utilize the services provided by these components.

In the configuration depicted in FIG. 22, software components 2218, 2220 and 2222 of system 2200 are shown as being implemented on server 2212. In other embodiments, one or more of the components of system 2200 and/or the services provided by these components may also be implemented by one or more of the client computing devices

2202, 2204, 2206, and/or 2208. Users operating the client computing devices may then utilize one or more client applications to use the services provided by these components. These components may be implemented in hardware, firmware, software, or combinations thereof. It should be appreciated that various different system configurations are possible, which may be different from distributed system 2200. The embodiment shown in FIG. 22 is thus one example of a distributed system for implementing an embodiment system and is not intended to be limiting.

Client computing devices 2202, 2204, 2206, and/or 2208 may include various types of computing systems. For example, a client computing device may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over network(s) 2210.

Although distributed system 2200 in FIG. 22 is shown with four client computing devices, any number of client computing devices may be supported. Other devices, such as devices with sensors, etc., may interact with server 2212.

Network(s) 2210 in distributed system 2200 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, network(s) 2210 can be a local area network (LAN), networks based on Ethernet, Token-Ring, a wide-area network, the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol), and/or any combination of these and/or other networks.

Server 2212 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 2212 can include one or more virtual machines running virtual operating systems, or other computing architectures involving virtualization. One or more flexible pools of logical storage devices can be virtualized to maintain virtual storage devices for the server. Virtual networks can be controlled by server 2212 using software defined networking. In various embodiments, server 2212 may be adapted to run one or more services or software applications described in the foregoing disclosure. For example, server 2212 may correspond to a server for performing processing as described above according to an embodiment of the present disclosure.

Server 2212 may run an operating system including any of those discussed above, as well as any commercially available server operating system. Server 2212 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 2212 may include one or more applications to analyze and consolidate data feeds and/or event updates received from users of client computing devices 2202, 2204, 2206, and 2208. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 2212 may also include one or more applications to display the data feeds and/or real-time events via one or more display devices of client computing devices 2202, 2204, 2206, and 2208.

Distributed system 2200 may also include one or more databases 2214 and 2216. These databases may provide a mechanism for storing information such as user interactions information, usage patterns information, adaptation rules information, and other information used by certain embodiments. Databases 2214 and 2216 may reside in a variety of locations. By way of example, one or more of databases 2214 and 2216 may reside on a non-transitory storage medium local to (and/or resident in) server 2212. Alternatively, databases 2214 and 2216 may be remote from server 2212 and in communication with server 2212 via a network-based or dedicated connection. In one set of embodiments, databases 2214 and 2216 may reside in a storage-area network (SAN). Similarly, any necessary files for performing the functions attributed to server 2212 may be stored locally on server 2212 and/or remotely, as appropriate. In one set of embodiments, databases 2214 and 2216 may include relational databases, such as databases provided by Oracle that are adapted to store, update, and retrieve data in response to SQL-formatted commands.

Figure 23:
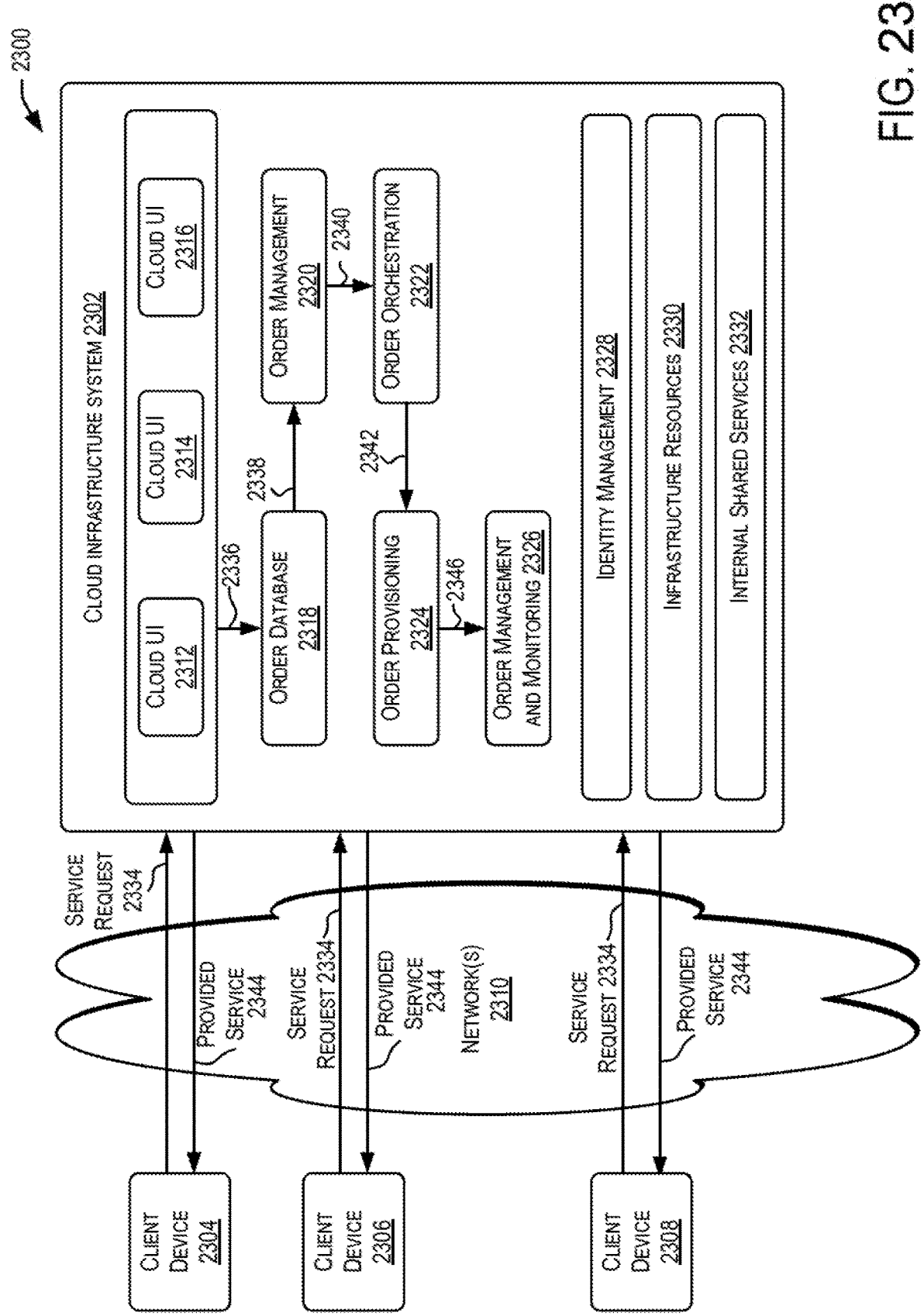
FIG. 23 illustrates a simplified block diagram of one or more components of a system environment in which services may be offered as cloud services, in accordance with an embodiment of the present disclosure.

In some embodiments, a cloud environment may provide one or more services. FIG. 23 is a simplified block diagram of one or more components of a system environment 2300 in which services may be offered as cloud services, in accordance with an embodiment of the present disclosure. In the illustrated embodiment in FIG. 23, system environment 2300 includes one or more client computing devices 2304, 2306, and 2308 that may be used by users to interact with a cloud infrastructure system 2302 that provides cloud services. Cloud infrastructure system 2302 may comprise one or more computers and/or servers.

It should be appreciated that cloud infrastructure system 2302 depicted in FIG. 23 may have other components than those depicted. Further, the embodiment shown in FIG. 23 is only one example of a cloud infrastructure system that may incorporate certain embodiments. In some other embodiments, cloud infrastructure system 2302 may have more or fewer components than shown in the figure, may combine two or more components, or may have a different configuration or arrangement of components.

Client computing devices 2304, 2306, and 2308 may be devices similar to those described above. Client computing devices 2304, 2306, and 2308 may be configured to operate a client application such as a web browser, a proprietary client application (e.g., Oracle Forms), or some other application, which may be used by a user of the client computing device to interact with cloud infrastructure system 2302 to use services provided by cloud infrastructure system 2302. Although exemplary system environment 2300 is shown with three client computing devices, any number of client computing devices may be supported. Other devices such as devices with sensors, etc. may interact with cloud infrastructure system 2302.

Network(s) 2310 may facilitate communications and exchange of data between client computing devices 2304, 2306, and 2308 and cloud infrastructure system 2302. Each network may be any type of network familiar to those skilled in the art that can support data communications using any of a variety of commercially-available protocols.

In certain embodiments, services provided by cloud infrastructure system 2302 may include a host of services that are made available to users of the cloud infrastructure system on demand. Various other services may also be offered including without limitation online data storage and backup solutions, Web-based e-mail services, hosted office suites and document collaboration services, database processing, managed technical support services, and the like. Services provided by the cloud infrastructure system can dynamically scale to meet the needs of its users.

In certain embodiments, a specific instantiation of a service provided by cloud infrastructure system 2302 may be referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 2302 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Cloud infrastructure system 2302 may also provide "big data" elated computation and analysis services. The term "big data" is generally used to refer to extremely large data sets that can be stored and manipulated by analysts and researchers to visualize large amounts of data, detect trends, and/or otherwise interact with the data. This big data and related applications can be hosted and/or manipulated by an infrastructure system on many levels and at different scales. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 2302 may be adapted to automatically provision, manage and track a customer's subscription to services offered by cloud infrastructure system 2302. Cloud infrastructure system 2302 may provide the cloud services via different deployment models. For example, services may be provided under a public cloud model in which cloud infrastructure system 2302 is owned by an organization selling cloud services (e.g., owned by Oracle Corporation) and the services are made available to the general public or different industry enterprises. As another example, services may be provided under a private cloud model in which cloud infrastructure system 2302 is operated solely for a single organization and may provide services for one or more entities within the organization. The cloud services may also be provided under a community cloud model in which cloud infrastructure system 2302 and the services provided by cloud infrastructure system 2302 are shared by several organizations in a related community. The cloud services may also be provided under a hybrid cloud model, which is a combination of two or more different models.

In some embodiments, the services provided by cloud infrastructure system 2302 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 2302. Cloud infrastructure system 2302 then performs processing to provide the services in the customer's subscription order.

In some embodiments, the services provided by cloud infrastructure system 2302 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by cloud infrastructure system 2302 via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by cloud infrastructure system 2302 without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 2302 may also include infrastructure resources 2330 for providing the resources used to provide various services to customers of the cloud infrastructure system. In one embodiment, infrastructure resources 2330 may include pre-integrated and optimized combinations of hardware, such as servers, storage, and networking resources to execute the services provided by the PaaS platform and the SaaS platform, and other resources.

In some embodiments, resources in cloud infrastructure system 2302 may be shared by multiple users and dynamically re-allocated per demand. Additionally, resources may be allocated to users in different time zones. For example, cloud infrastructure system 2302 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 2332 may be provided that are shared by different components or modules of cloud infrastructure system 2302 to enable provision of services by cloud infrastructure system 2302. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 2302 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 2302, and the like.

In one embodiment, as depicted in FIG. 23, cloud management functionality may be provided by one or more modules, such as an order management module 2320, an order orchestration module 2322, an order provisioning module 2324, an order management and monitoring module 2326, and an identity management module 2328. These modules may include or be provided using one or more computers and/or servers, which may be general purpose computers, specialized server computers, server farms, server clusters, or any other appropriate arrangement and/or combination.

In an exemplary operation, at 2334, a customer using a client device, such as client computing devices 2304, 2306 or 2308, may interact with cloud infrastructure system 2302 by requesting one or more services provided by cloud infrastructure system 2302 and placing an order for a subscription for one or more services offered by cloud infrastructure system 2302. In certain embodiments, the customer may access a cloud User Interface (UI) such as cloud UI 2312, cloud UI 2314 and/or cloud UI 2316 and place a subscription order via these UIs. The order information received by cloud infrastructure system 2302 in response to the customer placing an order may include information identifying the customer and one or more services offered by the cloud infrastructure system 2302 that the customer intends to subscribe to.

At 2336, the order information received from the customer may be stored in an order database 2318. If this is a new order, a new record may be created for the order. In one embodiment, order database 2318 can be one of several databases operated by cloud infrastructure system 2318 and operated in conjunction with other system elements.

At 2338, the order information may be forwarded to an order management module 2320 that may be configured to perform billing and accounting functions related to the order, such as verifying the order, and upon verification, booking the order.

At 2340, information regarding the order may be communicated to an order orchestration module 2322 that is configured to orchestrate the provisioning of services and resources for the order placed by the customer. In some instances, order orchestration module 2322 may use the services of order provisioning module 2324 for the provisioning. In certain embodiments, order orchestration module 2322 enables the management of business processes associated with each order and applies business logic to determine whether an order should proceed to provisioning.

As shown in the embodiment depicted in FIG. 23, at 2342, upon receiving an order for a new subscription, order orchestration module 2322 sends a request to order provisioning module 2324 to allocate resources and configure resources needed to fulfill the subscription order. Order provisioning module 2324 enables the allocation of resources for the services ordered by the customer. Order provisioning module 2324 provides a level of abstraction between the cloud services provided by cloud infrastructure system 2300 and the physical implementation layer that is used to provision the resources for providing the requested services. This enables order orchestration module 2322 to be isolated from implementation details, such as whether or not services and resources are actually provisioned on the fly or pre-provisioned and only allocated/assigned upon request.

At 2344, once the services and resources are provisioned, a notification may be sent to the subscribing customers indicating that the requested service is now ready for use. In some instance, information (e.g. a link) may be sent to the customer that enables the customer to start using the requested services.

At 2346, a customer's subscription order may be managed and tracked by an order management and monitoring module 2326. In some instances, order management and monitoring module 2326 may be configured to collect usage statistics regarding a customer use of subscribed services. For example, statistics may be collected for the amount of storage used, the amount data transferred, the number of users, and the amount of system up time and system down time, and the like.

In certain embodiments, cloud infrastructure system 2300 may include an identity management module 2328 that is configured to provide identity services, such as access management and authorization services in cloud infrastructure system 2300. In some embodiments, identity management module 2328 may control information about customers who wish to utilize the services provided by cloud infrastructure system 2302. Such information can include information that authenticates the identities of such customers and information that describes which actions those customers are authorized to perform relative to various system resources (e.g., files, directories, applications, communication ports, memory segments, etc.) Identity management module 2328 may also include the management of descriptive information about each customer and about how and by whom that descriptive information can be accessed and modified.

Figure 24:
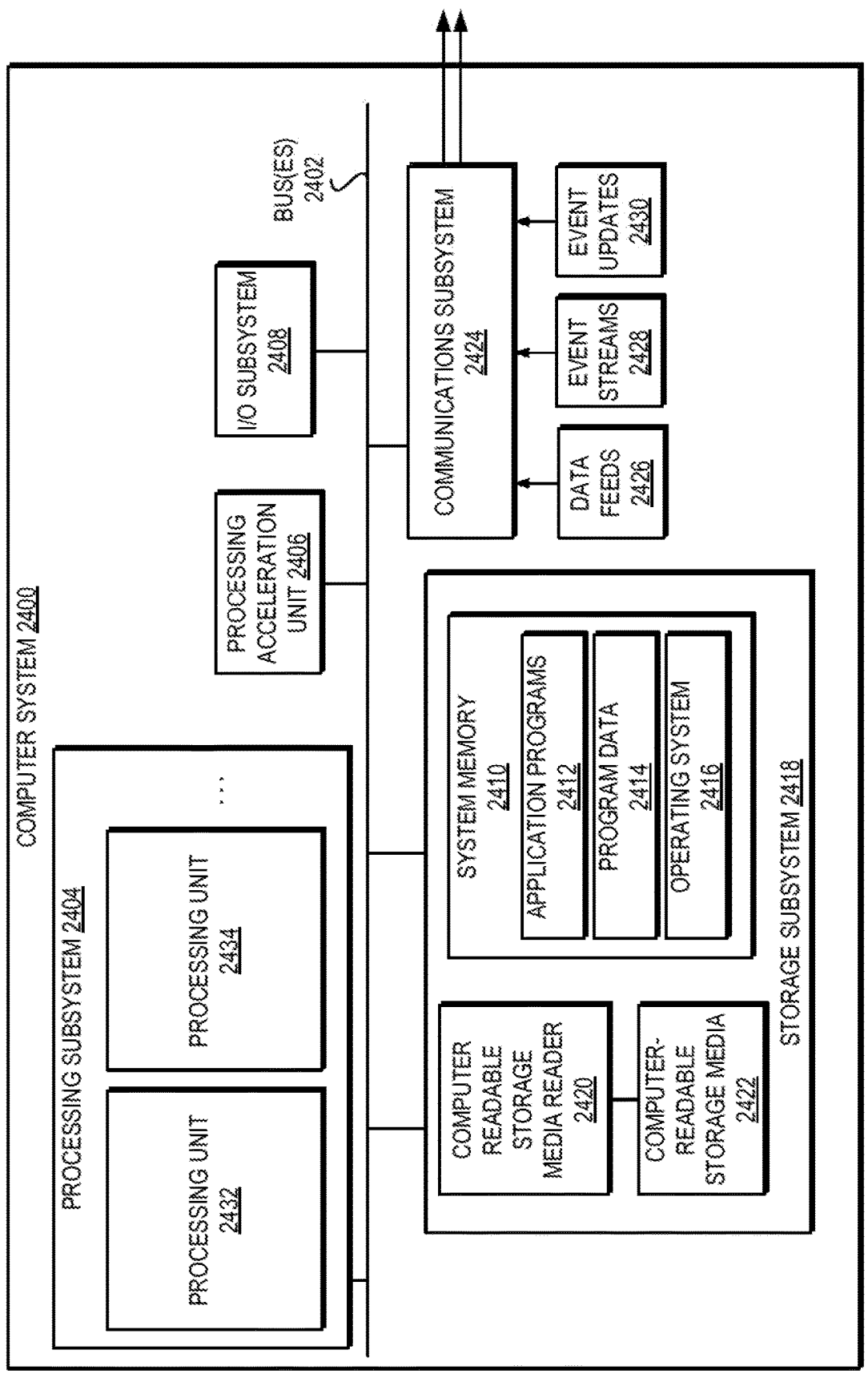
FIG. 24 illustrates an exemplary computer system that may be used to implement certain embodiments.

FIG. 24 illustrates an exemplary computer system 2400 that may be used to implement certain embodiments. In some embodiments, computer system 2400 may be used to implement any of the various servers and computer systems described above. As shown in FIG. 24, computer system 2400 includes various subsystems including a processing unit 2404 that communicates with a number of peripheral subsystems via a bus subsystem 2402. These peripheral subsystems may include a processing acceleration unit 2406, an I/O subsystem 2408, a storage subsystem 2418 and a communications subsystem 2424. Storage subsystem 2418 may include tangible computer-readable storage media 2422 and a system memory 2410.

Bus subsystem 2402 provides a mechanism for letting the various components and subsystems of computer system 2400 communicate with each other as intended. Although bus subsystem 2402 is shown schematically as a single bus, alternative embodiments of the bus subsystem may utilize multiple buses. Bus subsystem 2402 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 2404 controls the operation of computer system 2400 and may comprise one or more processing units 2432, 2434, etc. A processing unit may include be one or more processors, including single core or multicore processors, one or more cores of processors, or combinations thereof. In some embodiments, processing subsystem 2404 can include one or more special purpose co-processors such as graphics processors, digital signal processors (DSPs), or the like. In some embodiments, some or all of the processing units of processing subsystem 2404 can be implemented using customized circuits, such as application specific integrated circuits (ASICs), or field programmable gate arrays (FPGAs).

In some embodiments, the processing units in processing subsystem 2404 can execute instructions stored in system memory 2410 or on computer readable storage media 2422. In various embodiments, the processing units can execute a variety of programs or code instructions and can maintain multiple concurrently executing programs or processes. At any given time, some or all of the program code to be executed can be resident in system memory 2410 and/or on computer-readable storage media 2422 including potentially on one or more storage devices. Through suitable programming, processing subsystem 2404 can provide various functionalities.

In certain embodiments, a processing acceleration unit 2406 may be provided for performing customized processing or for off-loading some of the processing performed by processing subsystem 2404 so as to accelerate the overall processing performed by computer system 2400.

I/O subsystem 2408 may include devices and mechanisms for inputting information to computer system 2400 and/or for outputting information from or via computer system 2400. In general, use of the term "input device" is intended to include all possible types of devices and mechanisms for inputting information to computer system 2400. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 2400 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 2418 provides a repository or data store for storing information that is used by computer system 2400. Storage subsystem 2418 provides a tangible non-transitory computer-readable storage medium for storing the basic programming and data constructs that provide the functionality of some embodiments. Software (programs, code modules, instructions) that when executed by processing subsystem 2404 provide the functionality described above may be stored in storage subsystem 2418. The software may be executed by one or more processing units of processing subsystem 2404. Storage subsystem 2418 may also provide a repository for storing data used in accordance with certain embodiments.

Storage subsystem 2418 may include one or more non-transitory memory devices, including volatile and non-volatile memory devices. As shown in FIG. 24, storage subsystem 2418 includes a system memory 2410 and a computer-readable storage media 2422. System memory 2410 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 2400, such as during start-up, may typically be stored in the ROM. The RAM typically contains data and/or program modules that are presently being operated and executed by processing subsystem 2404. In some implementations, system memory 2410 may include multiple different types of memory, such as static random access memory (SRAM) or dynamic random access memory (DRAM).

By way of example, and not limitation, as depicted in FIG. 24, system memory 2410 may store application programs 2412, which may include client applications, Web browsers, mid-tier applications, relational database management systems (RDBMS), etc., program data 2414, and an operating system 2416. By way of example, operating system 2416 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 2422 may store programming and data constructs that provide the functionality of some embodiments. Software (programs, code modules, instructions) that when executed by processing subsystem 2404 a processor provide the functionality described above may be stored in storage subsystem 2418. By way of example, computer-readable storage media 2422 may include non-volatile memory such as a hard disk drive, a magnetic disk drive, an optical disk drive such as a CD ROM, DVD, a Blu-Ray® disk, or other optical media. Computer-readable storage media 2422 may include, but is not limited to, Zip® drives, flash memory cards, universal serial bus (USB) flash drives, secure digital (SD) cards, DVD disks, digital video tape, and the like. Computer-readable storage media 2422 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 2422 may provide storage of computer-readable instructions, data structures, program modules, and other data for computer system 2400.

In certain embodiments, storage subsystem 2400 may also include a computer-readable storage media reader 2420 that can further be connected to computer-readable storage media 2422. Together and, optionally, in combination with system memory 2410, computer-readable storage media 2422 may comprehensively represent remote, local, fixed, and/or removable storage devices plus storage media for storing computer-readable information.

In certain embodiments, computer system 2400 may provide support for executing one or more virtual machines. Computer system 2400 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 2400. Accordingly, multiple operating systems may potentially be run concurrently by computer system 2400. Each virtual machine generally runs independently of the other virtual machines.

Communications subsystem 2424 provides an interface to other computer systems and networks. Communications subsystem 2424 serves as an interface for receiving data from and transmitting data to other systems from computer system 2400. For example, communications subsystem 2424 may enable computer system 2400 to establish a communication channel to one or more client computing devices via the Internet for receiving and sending information from and to the client computing devices.

Communication subsystem 2424 may support both wired and/or wireless communication protocols. For example, in certain embodiments, communications subsystem 2424 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 2424 can provide wired network connectivity (e.g., Ethernet) in addition to or instead of a wireless interface.

Communication subsystem 2424 can receive and transmit data in various forms. For example, in some embodiments, communications subsystem 2424 may receive input communication in the form of structured and/or unstructured data feeds 2426, event streams 2428, event updates 2430, and the like. For example, communications subsystem 2424 may be configured to receive (or send) data feeds 2426 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 2424 may be configured to receive data in the form of continuous data streams, which may include event streams 2428 of real-time events and/or event updates 2430, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 2424 may also be configured to output the structured and/or unstructured data feeds 2426, event streams 2428, event updates 2430, and the like to one or more databases that may be in communication with one or more streaming data source computers coupled to computer system 2400.

Computer system 2400 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 2400 depicted in FIG. 24 is intended only as a specific example. Many other configurations having more or fewer components than the system depicted in FIG. 24 are possible. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the claimed embodiments. The modifications include any relevant combination of the disclosed features. Embodiments are not restricted to operation within certain specific data processing environments, but are free to operate within a plurality of data processing environments. Additionally, although certain embodiments have been described using a particular series of transactions and steps, it should be apparent to those skilled in the art that the scope is not limited to the described series of transactions and steps. Various features and aspects of the above-described embodiments may be used individually or jointly.

Further, while certain embodiments have been described using a particular combination of hardware and software, it should be recognized that other combinations of hardware and software are also within the scope of the claimed embodiments. Certain embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for interprocess communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A method comprising:
    receiving, at a computer system, an image of a graphical user interface (GUI) screen for an application;
    generating, by the computer system, a GUI model for the GUI screen, the GUI model comprising information indicative of a plurality of GUI components included in the GUI screen, information indicative of a physical layout of the plurality of GUI components, and information indicative of a first function associated with a first GUI component from the plurality of GUI components;
    wherein generating the GUI model comprises:
        partitioning, by the computer system, the image into a plurality of partitions, the plurality of partitions including a first partition and a second partition, wherein the image is partitioned using an edge detection technique, wherein the edge detection technique detects edges that visually define areas of the image to partition the image into the plurality of partitions;
        determining, by the computer system, a first set of rules for processing the first partition;
        determining, by the computer system, a second set of rules for processing the second partition, wherein the second set of rules is different from the first set of rules;
        processing, by the computer system, the first partition according to the first set of rules, the processing of the first partition comprising:
            determining, by the computer system, based upon the first set of rules, a first set of two or more GUI components included in the first partition and their layout; and
            determining, by the computer system, that the first function is to be associated with the first GUI component from the first set of two or more GUI components; and processing, by the computer system, the second partition according to the second set of rules to determine a second set of two or more GUI components included in the second partition and their layout.

2. The method of claim 1, wherein determining the first set of two or more GUI components included in the first partition and their layout comprises scanning pixels of the first partition to detect, within the first partition, one or more features that exceed a threshold probability of corresponding to a GUI component, and wherein the first function is determined based on the position of the first GUI component within the first partition.

3. The method of claim 2, wherein scanning the pixels of a partition of the image comprises at least one of detecting one or more text regions within the partition using optical character recognition; and detecting one or more images within the partition using blob detection.

4. The method of claim 2, wherein determining the first set of two or more GUI components included in the first partition and their layout further comprises, for a detected feature of the one or more detected features, identifying a known GUI component, from a set of known GUI components, that corresponds to the detected feature, wherein the identification is based on at least one of: one or more visual characteristics of the detected feature; and a position of the detected feature within the first partition.

5. The method of claim 2, wherein determining the first and the second sets of two or more GUI components included in the first and the second partitions and their layouts comprises:
recursively segmenting each of the first and the second partitions to determine a respective hierarchy of one or more segments, wherein each link within the hierarchy of one or more segments denotes a containment relationship between segments connected by the link; and
scanning pixels of the second partition to detect, within the second partition, one or more features that exceed the threshold probability of corresponding to a GUI component,
wherein each of the first and second partitions includes at least one of a header, a footer, or a body of the GUI screen, and wherein a plurality of visual features of the GUI screen are erased prior to segmenting at least one of the first and the second partitions.

6. The method of claim 5, wherein recursively segmenting the second partition to determine the hierarchy of one or more segments comprises:
initializing the hierarchy of one or more segments by placing the second partition at a root of the hierarchy of one or more segments;
detecting one or more top-level segments within the second partition by segmenting the second partition;
placing each of the one or more top-level segments as direct children of the root of the hierarchy of one or more segments; and
while the hierarchy of one or more segments has one or more unprocessed segments:
selecting an unprocessed segment from the hierarchy of one or more segments; attempt to detect sub-segments within the selected segment by segmenting the selected segment; and
when one or more sub-segments are detected within the selected segment, adding the one or more sub-segments to the hierarchy of one or more segments, wherein the one or more sub-segments are placed as direct children of the selected segment.

7. The method of claim 6, wherein segmenting the selected segment comprises:
attempting to identify, from one or more detected edges that are located within the selected segment and one or more borders of the selected segment, one or more closed contours within the selected segment; and
for each of the one or more closed contours identified within the selected segment:
fitting an approximate polygon onto the closed contour; and
identifying a sub-segment that corresponds to the approximate polygon.

8. The method of claim 1 further comprising:
generating, by the computer system, using the GUI model, code that is executable by one or more processors and, when executed by the one or more processors causes the one or more processors to execute the first function when the first GUI component is interacted with.

9. The method of claim 1, wherein the first function corresponds to one of:
a cancel function, wherein invoking the cancel function cancels an action that was invoked via the GUI;
a back function, wherein invoking the back function causes the GUI to return to a previous screen, mode, view, or window of the GUI;
an exit function, wherein invoking the exit function causes an underlying program associated with the GUI to close or halt execution on a device that is executing the underlying program;
a minimize function, wherein invoking the minimize function minimizes a screen or window of the GUI;
a maximize function, wherein invoking the maximize function maximizes the screen or window of the GUI;
an add function, wherein the add function is invoked for adding an item via the GUI;
a delete function, wherein the delete function is invoked for deleting a selected item via the GUI;
an option function, where invoking the option function launches a menu for configuring options or settings;
a drill-down function, where invoking the drill-down function causes the GUI to transition to a more specific screen, a more specific mode, a more specific view, or a more specific window of the GUI;
a save function, where invoking the save function causes the GUI to save a document;
an edit function, where invoking the edit function causes the GUI to facilitate editing of the document; and
a search function, where invoking the searching function causes the GUI to facilitate searching data.

10. The method of claim 1, wherein the association between the first GUI component and the first function is determined from a dictionary that is specific to a domain of the first GUI component.

11. A non-transitory computer-readable storage memory storing a plurality of instructions executable by one or more processors, the plurality of instructions comprising:
instructions that cause the one or more processors to receive an image of a graphical user interface (GUI) screen for an application;
instructions that cause the one or more processors to generate a GUI model for the GUI screen, the GUI model comprising information indicative of a plurality of GUI components included in the GUI screen, information indicative of a physical layout of the plurality of GUI components, and information indicative of a first function associated with a first GUI component from the plurality of GUI components; wherein generating the GUI model comprises:

partitioning the image into a plurality of partitions, the plurality of partitions including a first partition and a second partition, wherein the image is partitioned using an edge detection technique, wherein the edge detection technique detects edges that visually define areas of the image to partition the image into the plurality of partitions;

determining a first set of rules for processing the first partition; determining a second set of rules for processing the second partition, wherein the second set of rules is different from the first set of rules;

processing the first partition according to the first set of rules, the processing of the first partition comprising:

determining based upon the first set of rules, a first set of two or more GUI components included in the first partition and their layout; and determining that the first function is to be associated with the first GUI component from the first set of two or more GUI components; and processing the second partition according to the second set of rules to determine a second set of two or more GUI components included in the second partition and their layout.

12. The non-transitory computer-readable storage memory of claim 11, wherein determining the first set of two or more GUI components included in the first partition and their layout comprises scanning pixels of the first partition to detect, within the first partition, one or more features that exceed a threshold probability of corresponding to a GUI component, and wherein the first function is determined based on the position of the first GUI component within the first partition.

13. The non-transitory computer-readable storage memory of claim 12, wherein scanning the pixels of a partition of the image comprises at least one of detecting one or more text regions within the partition using optical character recognition; and detecting one or more images within the partition using blob detection.

14. The non-transitory computer-readable storage memory of claim 12, wherein determining the first set of two or more GUI components included in the first partition and their layout further comprises, for a detected feature of the one or more detected features, identifying a known GUI component, from a set of known GUI components, that corresponds to the detected feature, wherein the identification is based on at least one of: one or more visual characteristics of the detected feature; and a position of the detected feature within the first partition.

15. The non-transitory computer-readable storage memory of claim 12, wherein determining the first and second sets of two or more GUI components included in the first and second partitions and their layouts comprises:

recursively segmenting each of the first and the second partitions to determine a respective hierarchy of one or more segments, wherein each link within the hierarchy of one or more segments denotes a containment relationship between segments connected by the link; and scanning pixels of the second partition to detect, within the second partition, one or more features that exceed the threshold probability of corresponding to a GUI component, wherein each of the first and second partitions includes at least one of a header, a footer, or a body of the GUI screen, and wherein a plurality of visual features of the GUI screen are erased prior to segmenting at least one of the first and the second partitions.

16. The non-transitory computer-readable storage memory of claim 15, wherein recursively segmenting the second partition to determine the hierarchy of one or more segments comprises:

initializing the hierarchy of one or more segments by placing the second partition at a root of the hierarchy of one or more segments;

detecting one or more top-level segments within the second partition using segmentation; placing each of the one or more top-level segments as direct children of the root of the hierarchy of one or more segments; and while the hierarchy of one or more segments has one or more unprocessed segments:

selecting an unprocessed segment from the hierarchy of one or more segments; attempt to detect sub-segments within the selected segment by segmenting the selected segment; and when one or more sub-segments are detected within the selected segment, adding the one or more sub-segments to the hierarchy of one or more segments, wherein the one or more sub-segments are placed as direct children of the selected segment.

17. The non-transitory computer-readable storage memory of claim 16, wherein segmenting the selected segment comprises:

attempting to identify, from one or more detected edges that are located within the selected segment and one or more borders of the selected segment, one or more closed contours within the selected segment; and for each of the one or more closed contours identified within the selected segment:

fitting an approximate polygon onto the closed contour; and identifying a sub-segment that corresponds to the approximate polygon.

18. The non-transitory computer-readable storage memory of claim 11, wherein the plurality of instructions further comprise: instructions that cause the one or more processors to generate, using the GUI model, code that is executable by the one or more processors and, when executed by the one or more processors causes the one or more processors to execute the first function when the first GUI component is interacted with.

19. The non-transitory computer-readable storage memory of claim 11, wherein the first function corresponds to one of:

a cancel function, wherein invoking the cancel function cancels an action that was invoked via the GUI;

a back function, wherein invoking the back function causes the GUI to return to a previous screen, mode, view, or window of the GUI;

an exit function, wherein invoking the exit function causes an underlying program associated with the GUI to close or halt execution on a device that is executing the underlying program;

a minimize function, wherein invoking the minimize function minimizes a screen or window of the GUI;

a maximize function, wherein invoking the maximize function maximizes the screen or window of the GUI;

an add function, wherein the add function is invoked for adding an item via the GUI;

a delete function, wherein the delete function is invoked for deleting a selected item via the GUI;

an option function, where invoking the option function launches a menu for configuring options or settings;

a drill-down function, where invoking the drill-down function causes the GUI to transition to a more specific screen, a more specific mode, a more specific view, or a more specific window of the GUI;

a save function, where invoking the save function causes the GUI to save a document;

an edit function, where invoking the edit function causes the GUI to facilitate editing of the document; and a search function, where invoking the searching function causes the GUI to facilitate searching data.

20. A system comprising: one or more processors; and a memory coupled with and readable by the one or more processors, the memory configured to store a set of instructions which, when executed by the one or more processors, cause the one or more processors to:

receive an image of a graphical user interface (GUI) screen for an application;

generate a GUI model for the GUI screen, the GUI model comprising information indicative of a plurality of GUI components included in the GUI screen, information indicative of a physical layout of the plurality of GUI components, and information indicative of a first function associated with a first GUI component from the plurality of GUI components; wherein generating the GUI model comprises:

partitioning the image into a plurality of partitions, the plurality of partitions including a first partition and a second partition, wherein the image is partitioned using an edge detection technique, wherein the edge detection technique detects edges that visually define areas of the image to partition the image into the plurality of partitions;

determining a first set of rules for processing the first partition; determining a second set of rules for processing the second partition, wherein the second set of rules is different from the first set of rules;

processing the first partition according to the first set of rules, the processing of the first partition comprising:

determining based upon the first set of rules, a first set of two or more GUI components included in the first partition and their layout; and determining that the first function is to be associated with the first GUI component from the first set of two or more GUI components; and processing the second partition according to the second set of rules to determine a second set of two or more GUI components included in the second partition and their layout.

* * * * *

UNITED STATES PATENT AND TRADEMARK OFFICE
CERTIFICATE OF CORRECTION

PATENT NO. : 10,733,754 B2  
APPLICATION NO. : 15/613122  
DATED : August 4, 2020  
INVENTOR(S) : Dayanandan et al.

Page 1 of 1

It is certified that error appears in the above-identified patent and that said Letters Patent is hereby corrected as shown below:

On the Title Page

On page 2, Column 2, under Other Publications, Line 10, delete "avaiiable" and insert -- available --, therefor.

On page 2, Column 2, under Other Publications, Line 19, delete "availabie" and insert -- available --, therefor.

On page 2, Column 2, under Other Publications, Line 29, delete "-Deuglas-" and insert -- -Douglas- --, therefor.

In the Specification

In Column 7, Line 22, delete "embodiments" and insert -- embodiments. --, therefor.

In Column 7, Line 24, delete "embodiments" and insert -- embodiments. --, therefor.

In Column 8, Line 66, delete "the the" and insert -- the --, therefor.

In Column 12, Line 52, delete "may by" and insert -- may be --, therefor.

In Column 16, Line 24, delete "a a" and insert -- a --, therefor.

In Column 16, Line 37, delete "preassociated" and insert -- pre-associated --, therefor.

In Column 22, Line 22, delete "FIGS. 6-8" and insert -- FIGS. 6-8. --, therefor.

In Column 25, Line 65, delete "processsing" and insert -- processing --, therefor.

In Column 33, Line 31, delete "preassociated" and insert -- pre-associated --, therefor.

Signed and Sealed this  
Twenty-seventh Day of April, 2021

Drew Hirshfeld  
*Performing the Functions and Duties of the*  
*Under Secretary of Commerce for Intellectual Property and*  
*Director of the United States Patent and Trademark Office*